US008751856B2

(12) United States Patent
Lumpp et al.

(10) Patent No.: US 8,751,856 B2
(45) Date of Patent: *Jun. 10, 2014

(54) DETERMINING RECOVERY TIME FOR INTERDEPENDENT RESOURCES IN HETEROGENEOUS COMPUTING ENVIRONMENT

(75) Inventors: Thomas Lumpp, Reutlingin (DE); David B. Petersen, Great Falls, VA (US); Wolfgang Schaeberle, Nufringen (DE); Jeurgen Schneider, Althengstedt (DE); Isabell Schwertle, Metzingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,186

(22) Filed: Oct. 10, 2011

(65) Prior Publication Data
US 2012/0089862 A1   Apr. 12, 2012

Related U.S. Application Data

(63) Continuation of application No. 12/344,893, filed on Dec. 29, 2008, now Pat. No. 8,037,341.

(51) Int. Cl.
*G06F 11/00*   (2006.01)

(52) U.S. Cl.
USPC .................................. 714/2; 714/1; 702/186

(58) Field of Classification Search
None
See application file for complete search history.

(56) References Cited

U.S. PATENT DOCUMENTS

| | | | |
|---|---|---|---|
| 6,594,786 | B1 | 7/2003 | Connelly et al. |
| 6,996,502 | B2 | 2/2006 | De La Cruz et al. |
| 2004/0049365 | A1 | 3/2004 | Keller et al. |
| 2005/0172306 | A1* | 8/2005 | Agarwal et al. ............... 719/328 |
| 2006/0074993 | A1 | 4/2006 | Pulamarasetti et al. |
| 2007/0260908 | A1 | 11/2007 | Mitchell et al. |
| 2008/0189717 | A1 | 8/2008 | Agarwal et al. |
| 2009/0158292 | A1 | 6/2009 | Rattner et al. |
| 2009/0165002 | A1 | 6/2009 | Sterbenz |
| 2009/0172461 | A1 | 7/2009 | Bobak et al. |
| 2009/0313626 | A1 | 12/2009 | Dawson et al. |
| 2010/0169703 | A1 | 7/2010 | Lumpp et al. |

OTHER PUBLICATIONS

USPTO, "Non-Final Office Action," U.S. Appl. No. 12/344,893, Dec. 21, 2010.

(Continued)

*Primary Examiner* — Yolanda L Wilson
(74) *Attorney, Agent, or Firm* — Matthew B. Talpis; Gregory K. Goshorn; Greg Goshorn, P.C.

(57) ABSTRACT

Provided are techniques for determining a recovery time for a resource in a heterogeneous computing environment comprising interdependent resources. A graph for the resource representing all sequence dependencies and all group relations are created. The recovery time may be a cumulative startup time or a cumulative shutdown time of the resource considering interdependencies of the resource to other resources. The recovery time for all support resources having sequence dependencies with the resource is calculated and each node representing the support resources are removed from the graph. Then the recovery time for all member resources left in the graph that have group relations with the resource is calculated per a group type of the resource. The recovery time for the resource is a sum of the recovery time of all support resources, the recovery time of all member resources, and a unit recovery time of the resource.

25 Claims, 17 Drawing Sheets

(56) References Cited

OTHER PUBLICATIONS

Goshorn, "Applicant Summary of Interview With Examiner," U.S. Appl. No. 12/344,893, Mar. 21, 2011.

Goshorn, "Response to Office Action," U.S. Appl. No. 12/344,893, Mar. 21, 2011.

* cited by examiner

Figure 11A

TIVOLI  IBM®

Startup and Shutdown Times for a selected resource Report

Resource Name    Homebanking Application

Time Interval    Nov 20, 2007 12:00 AM – Dec 20, 2007 11:59 PM

Active policy at report FriendlyE2E – FriendlyE2E    Active since:  Dec 20, 2007 12:26 PM
generation > ⚠ Event recording unavailable
> The event recording was unavailable/impossible form Dec 20, 2007 12:26:11 PM to Dec 20, 2007
> 12:26:11 PM Summary

| Resource startup time | | Cumulative startup time | |
|---|---|---|---|
| Minimum | 00:05:00 | Minimum | 00:05:00 |
| Maximum | 00:12:00 | Maximum | 00:12:00 |
| Average | 00:09:00 | Average | 00:09:00 |

| Resource shutdown time | | Cumulative shutdown time | |
|---|---|---|---|
| Minimum | 00:03:20 | Minimum | 00:03:20 |
| Maximum | 00:10:20 | Maximum | 00:10:20 |
| Average | 00:07:00 | Average | 00:07:00 |

Startup times

Chart shows average cumulative startup times

DETERMINING RECOVERY TIME FOR INTERDEPENDENT RESOURCES IN HETEROGENEOUS COMPUTING ENVIRONMENT

CROSS REFERENCES OF RELATED INVENTIONS

The present application is a Continuation of U.S. patent application Ser. No. 12/344,893, now U.S. Pat. No. 8,037,341, entitled "Determining Recovery Time for Interdependent Resources in Heterogeneous Computing Environments," filed Dec. 29, 2008, assigned to the assignee of the present application, and herein incorporated by reference

FIELD OF THE DISCLOSURE

The present application discloses techniques for determining recovery time of a resource in complex computing environment with multiple heterogeneous resources.

BACKGROUND OF THE INVENTION

When an enterprise business application fails, it is desirable to recover services as soon as possible. A usual fault-tolerant system comprises backups for resources such as a server, a data, a network, a site, etc. One quality metric of backup resources is a Recovery Time Objective (RTO), or a recovery time, that defines a goal for a time span within which a backup resource is selected and prepared to take over such that the backup resource restarts a failed service. Relationships and dependencies among resources are desired to he considered in calculating the recovery time of the backup resource. However, there is no conventional method of estimating the recovery time that is applicable to resources for a complex computing environment. Conventional methods render inaccurate estimations because they do not utilize historical recovery data.

Thus, there is a need for a system and associated method that overcomes at least one of the preceding disadvantages of current methods and systems of determining the recovery time of a resource in a complex computing environment.

SUMMARY OF THE INVENTION

The present disclosure provides techniques for determining a recovery time for a resource of at least one resource in a heterogeneous computing environment, the method comprising: creating a graph G_R of a root node R such that the graph G_R represents an interdependency of the resource represented by the root node R among said at least one resource, said interdependency comprising zero or more sequence dependencies of the resource and zero or more group relations of the resource, each sequence dependency of said zero or more sequence dependencies of the resource on a respective support resource represented by a respective sequence edge from the root node R to a respective support node RJ, each sequence dependency denoting that the resource transits from a first state to a second state after all support resources transit from the first state to the second state, each group relation of zero or more group relations of the resource between the resource and a respective member resource represented by a respective member edge from the root node R to a respective member node RK, each group relation denoting that the resource transits from the first state to the second state after all member resources transit from the first state to the second state; and traversing the graph G_R that results in the recovery time TIME(G_R) for the resource represented by the root node R, wherein the recovery time TIM E(G_R) for the resource is defined as a duration of time from an initial point of time when all resources in the graph G_R are in the first state to a final point of time when the resource represented by the root node R transits to the second state as a result of transitions of all resources in the graph G_R from the first state to the second state.

The present disclosure provides techniques that overcome at least one of the current disadvantages of conventional techniques for determining a recovery time of an interdependent resource in a complex computing environment.

BRIEF DESCRIPTION OF THE DRAWINGS

FIGS. 11A, 11B, and 11C are an example of a recovery time report generated by the report generator on the example system of FIGS. 2A, 2B, and 3, in accordance with the embodiments of the present invention.

DETAILED DESCRIPTION OF THE INVENTION

Figure 1:
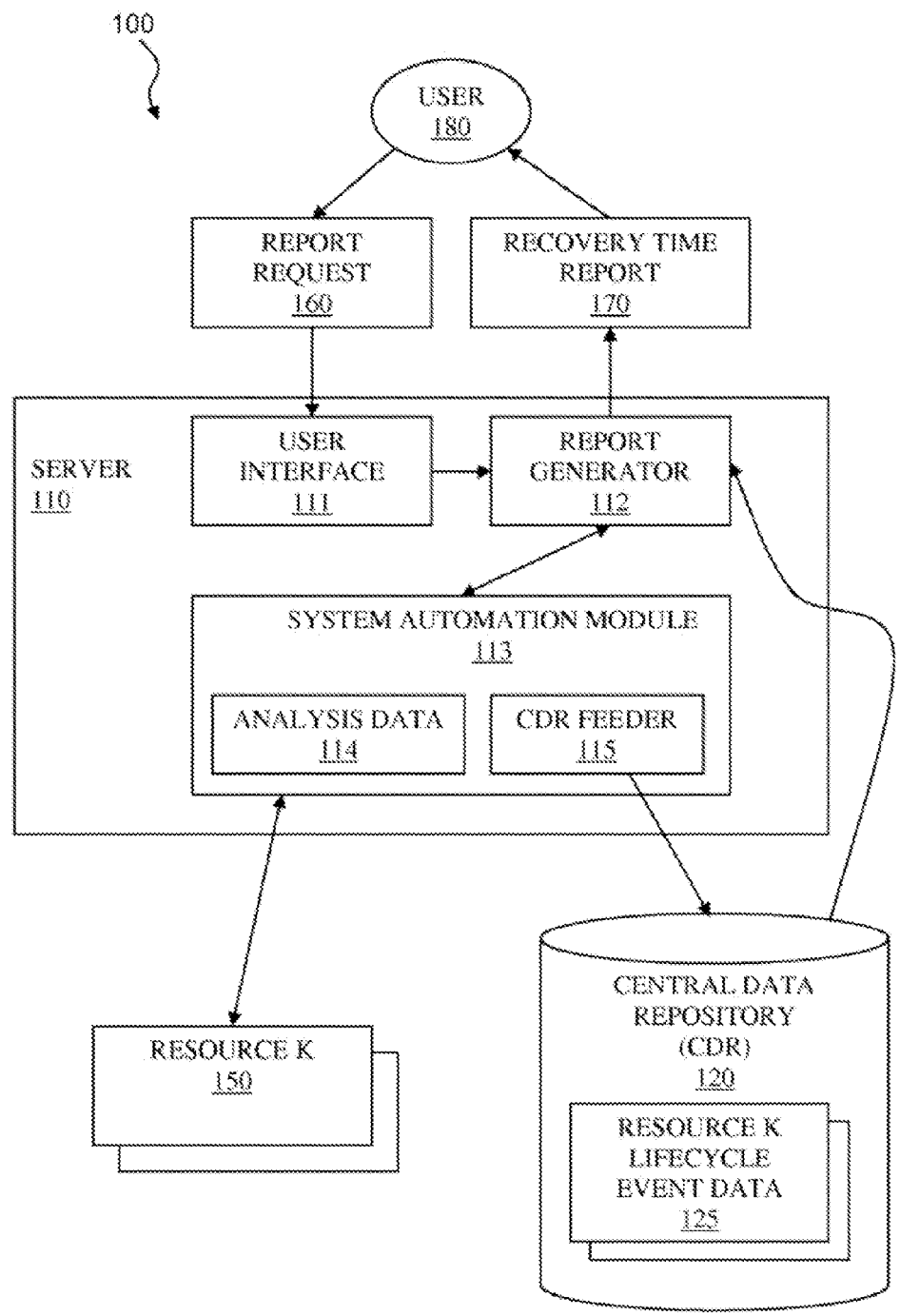
FIG. 1 illustrates a system 100 for determining recovery time for interdependent resources in a heterogeneous computing environment, in accordance with embodiments of the present invention.

FIG. 1 illustrates a system 100 for determining recovery time for interdependent resources in a heterogeneous computing environment, in accordance with embodiments of the present invention.

The system 100 comprises a server 110, at least one resource, and a central data repository (CDR) 120. The CDR 120 comprises lifecycle event data of said at least one resource.

The server 110 comprises a user interface 111, a report generator 112, and a system automation module 113.

The user interface 111 receives a report request 160 for a recovery time report 170 of a resource K 150 of said at least one resource from a user 180. The user interface 111 passes content of the report request 160 to the report generator 112 as an input.

The resource K 150 is any hardware and/or software computing resource that may be, inter alia, a piece of data such as an Internet Protocol (IP) address, a logical service, a network, a software program, a server, a storage device, or any combination of multiple resources such as a cluster of servers installed with multiple software programs, an integrated development environment, a database management system, etc. The resource K 150 is modeled as a resource K lifecycle event data 125 in the CDR 120.

The resource K 150 may depend on another resource of said at least one resource to he in service. Also the resource K 150 may be a member in a group of resources. Information on dependencies and group relationship of the resource K 150 is managed by the system automation module 113.

The system automation module 113 processes a resource K lifecycle event data 125 stored in the CDR 120 to provide a result to the report generator 112. The system automation module 113 comprises analysis data 114.

The analysis data 114 comprise start dependencies, stop dependencies, and, group relationships among resources, and rules to calculate recovery time of resources per start/stop dependencies and group relationships. The start/stop dependencies and group relationships are collectively referred to as interdependencies in this specification. The analysis data 114 describe how a resource is related to the rest of resources, which is referred to as a resource topology and represented as an interdependency graph in this specification. The rules of the analysis data 114 are utilized to create and to process the interdependency graph of resources in determining the amount of recovery time during which a backup resource of a failed resource is activated and take over the failed resource wherein the backup resource is interdependent to other resources in a computing environment comprising many heterogeneous resources. The analysis data 114 is managed separately from the lifecycle event data 125 such that a resource topology can be updated without affecting lifecycle event data or a resource stored in the CDR 120 in generating the recovery time report 170. See descriptions of FIG. 5, infra, for specifics of the analysis data.

This enables the user to apply newer and changed IT relationship graphs and still use the historical gathered startup/shutdown time. So reports can be produced after each change assuming that the restart of the single IT resource hasn't changed but the recovery flow itself.

The resource K lifecycle event data 125 is recorded in the CDR 120 by a CDR feeder 115 in the system automation module 113 upon occurrence of each resource K lifecycle event that is predetermined to be recorded. An interface between the CDR feeder 115 and the CDR 120 is independent from a platform running the server 110. A resource K lifecycle event is a state transition of the resource K 150. See description of FIG. 4, infra, for parameters of the resource K lifecycle event data 125 and lifecycle events to be recorded in the CDR 120. The resource K lifecycle event data 125 provides historical usage data on the resource K 150 to acquire statistics on average, peaks, deviations, etc., over a lifetime of the resource K 150.

The report generator 112 calculates recovery time of the resource K 150 with a result from the system automation module 113, creates the recovery time report 170 pursuant to the report request 160, and returns the recovery time report 170 to the user 180. The recovery time report 170 provides information necessary for developing more efficient resource topology of a computing environment wherein the resource K 150 operates. See description of FIGS. 5 and 6, infra, for details on operations of the report generator 112.

In one embodiment of the present invention, the server 110 is an IBM.™. Websphere.™. Application Server with Tivoli.™. System Automation for Application Manager installed (SA AM) and the user interface 111 is a web application. The report generator 112 employs the IBM Business Intelligence and Reporting Tools/Tivoli.™. Common Reporting (BIRT/TCR) infrastructure based on Java.™. and the Java 2 Platform Enterprise Edition (J2EE.™.) in servicing resource clusters such as Linux.™. servers and/or z/OS.™. Sysplex servers. The CDR 120 is DB2.™. database system. (IBM, Websphere, Tivoli, z/OS, and DB2 are registered trademarks of the International Business Machines, Inc., in the United States and/or other countries; Linux is a registered trademark of Linos Torvalds in the United States and/or other countries; and Java and J2EE, are registered trademarks of the Sun Microsystems, Inc., in the United States and/or other countries.)

Figure 2A:
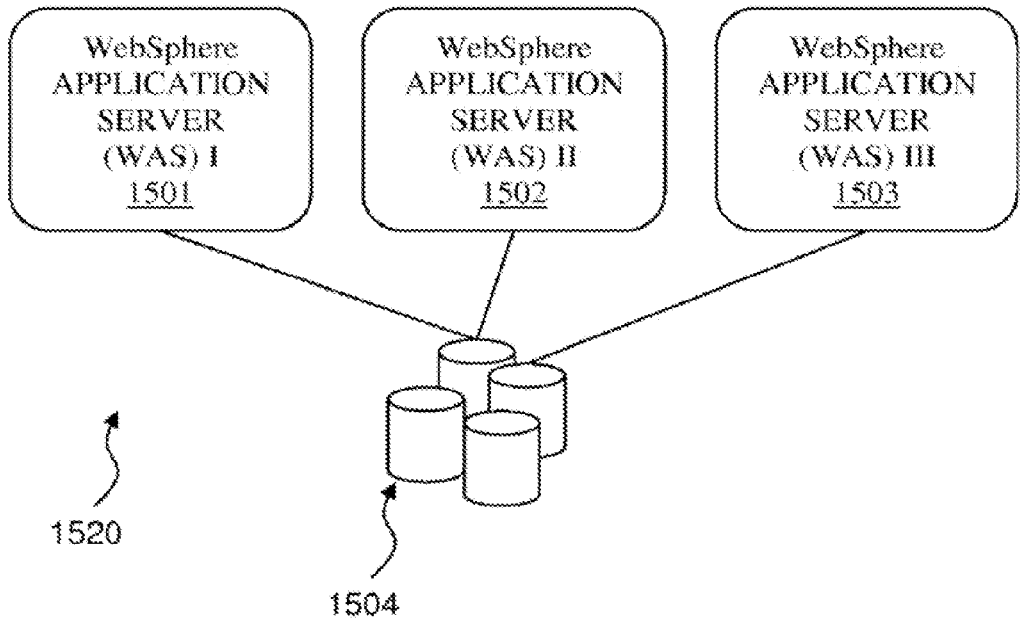
FIGS. 2A and 2B illustrate a home-banking application operating in heterogeneous resources, in accordance with the embodiments of the present invention.
Figure 2B:
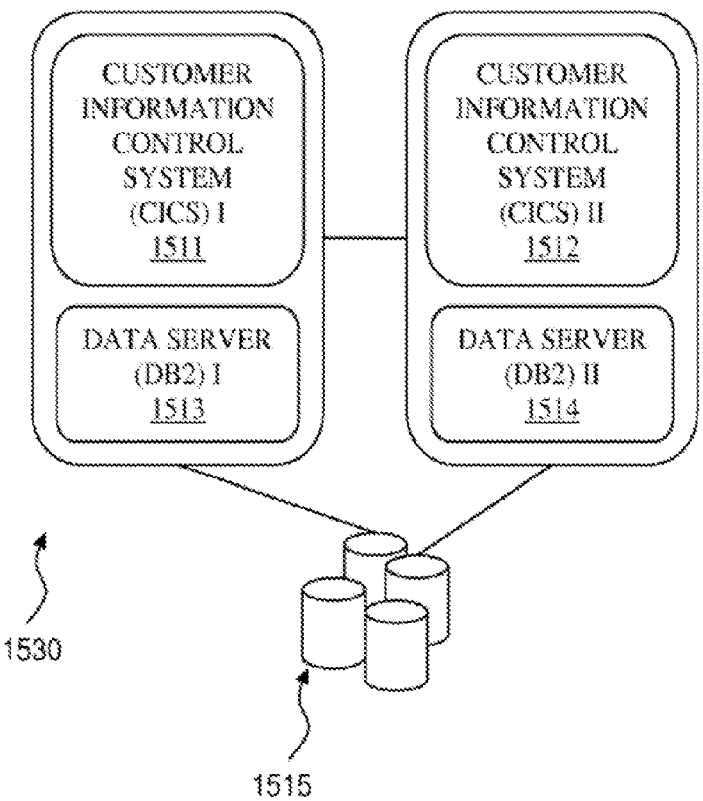

FIGS. 2A and 2B illustrate a home-banking application operating in heterogeneous resources, in accordance with the embodiments of the present invention.

FIG. 2A illustrates a Web User Interface reference 1520 of the home-banking application 1520 comprising more than one IBM WebSphere Application Servers (WAS), WAS I 1501, WAS II, 1502, and WAS III 1503 that operates on three AIX.™./pSeries.™. servers 1504 running UNIX operating systems. (AIX and pSeries are registered trademarks of the International Business Machines, Inc., in the United States and/or other countries.)

FIG. 28 illustrates two core banking references 1530 comprising two Customer Information Control Systems (CICS.™.) of CICS I 1511 and CICS II 1512 and two DB2 data servers of DB2.RTM. I 1513 and DB2 II 1514 that operate on a Sysplex.™. server cluster 1515 running a z/OS.™. operating system. (CICS, DB2, Sysplex, and z/OS are registered trademarks of the International Business Machines. Inc., in the United States and/or other countries.)

Figure 3:
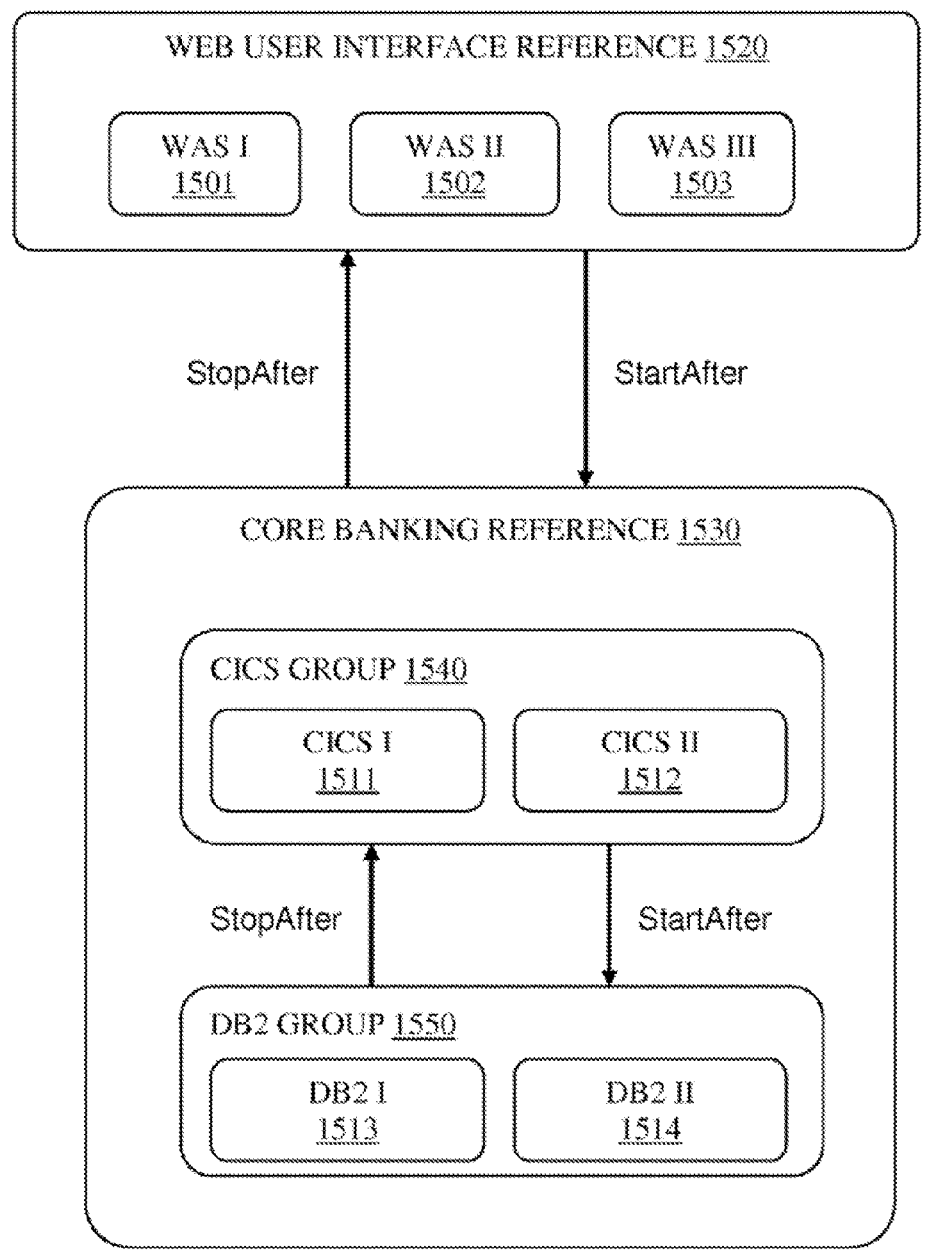
FIG. 3 illustrates dependencies among resources in the home-banking application of FIGS. 2A and 2B, in accordance with the embodiments of the present invention.

FIG. 3 illustrates dependencies among resources in the home-banking application of FIGS. 2A and 2B, supra, in accordance with the embodiments of the present invention.

The home-banking application is an enterprise-wide automation system comprising two resource groups of the Web User Interface (WebUI) reference 1520 and the core banking reference 1530. Both groups are labeled as First Level Automation (FLA).

A start dependency represented as "startAfter" between a first resource and a second resource denotes that the first resource starts after the second resource. The startAfter dependency exists between the WebUI reference 1520 and the core banking reference 1530 such that the WebUI reference 1520 starts after the core banking reference 1530.

A stop dependency represented as "stopAfter" between the second resource and the first resource denotes that the second resource stops after the first resource. The stopAfter dependency exists between the core banking reference 1530 and the WebUI reference 1520 such that the core banking reference 1530 stops after the WebUI reference 1520.

The core banking reference 1530 comprises two resource groups of a CICS group 1540 and a DB2 group 1550. A startAfter dependency and a stopAfter dependency exist between the CICS group 1540 and the DB2 group 1550, respectively.

A group relationship exists between a resource group and members of the resource group such that for the resource group to start, all members in the resource group need to start. Consequently, the CICS group 1540 starts when both CICS I 1511 and CICS II 1512 have been successfully started. The DB2 group 1550 starts when both DB2 I 1513 and DB2 II 1514 have been successfully started.

Accordingly, in order to start the home-banking application, both DB2 I 1513 and DB2 II 1514 in the DB2 group 1550 start first. When data services provided by the DB2 group 1550 are available, then the CICS group 1540 starts by starting both CICS I 1511 and CICS 1512. When customer information services provided by the CICS group 1540 are available, then the core banking reference 1530 starts. After the core banking reference 1530 starts first, then the WebUI reference 1520 residing in another platform starts by starting WAS I 1501, WAS II, 1502, and WAS III 1503. When web services provided by the WebUI reference 1520 are available, the home-banking application is available for users.

During a lifecycle of the home-banking application. lifecycle events are recorded and recovery time reports are provided upon requests. See FIG. 12, infra, for an example of a recovery time report of the home-banking application.

Figure 4:
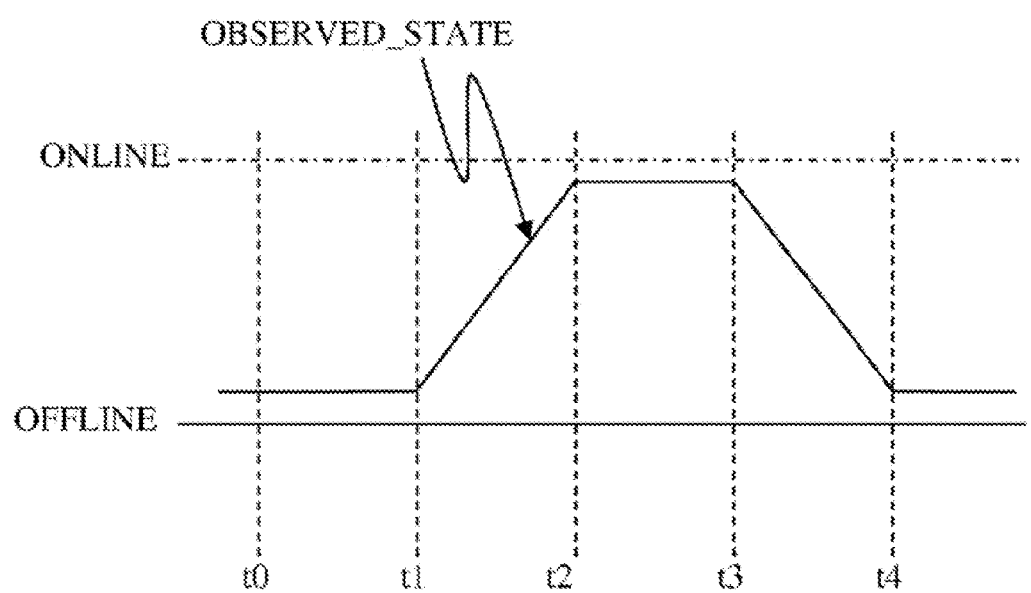
FIG. 4 illustrates lifecycle events of a resource, in accordance with the embodiments of the present invention.

FIG. 4 illustrates lifecycle events of a resource, in accordance with the embodiments of the present invention.

A lifecycle event data comprises parameters of a TIMESTAMP, a RESOURCENAME, a RESOURCECLASS, a NODENAME, a DOMAINNAME, and an OBSERVED STATE.

The TIMESTAMP is a point of time when a lifecycle event occurred. The RESOURCENAME is a name of the resource wherein the lifecycle event occurred. The RESOURCECLASS is a class to which the resource is a member. The NOD NAME denotes a node in which the resource is operating. The DOMAINNAME is a name of a domain to which the resource is an element. The resource is identified by a combination of the RESOURCENAME, the RESOURCECLASS, the NODENAME, and the DOMAINNAME. The OBSERVED_STATE is an actual state of the resource at the time when the lifecycle event occurs.

There are four state phases for the resource, which are {OFFLINE, STARTUP, ONLINE, SHUTDOWN}. OFFLINE is a state phase during which the resource is not active. ONLINE is a state phase during which the resource is actively running. STARTUP is a state phase during which the resource is moving from OFFLINE to ONLINE. SHUTDOWN is a state phase during which the resource is moving from ONLINE to OFFLINE.

A period of time between t0 and t1 is a downtime of the resource in the OFFLINE state. At time t1, the resource changes the state from OFFLINE to STARTUP as the resource is getting started. At time t2, the resource changes the state from STARTUP to ONLINE as the resource is fully started and actively running. At time t3, the resource changes the state from ONLINE to SHUTDOWN as the resource is stopping. At time t4, the resource changes the state from SHUTDOWN to OFFLINE as the resource completely stops and becomes inactive.

Figure 5:
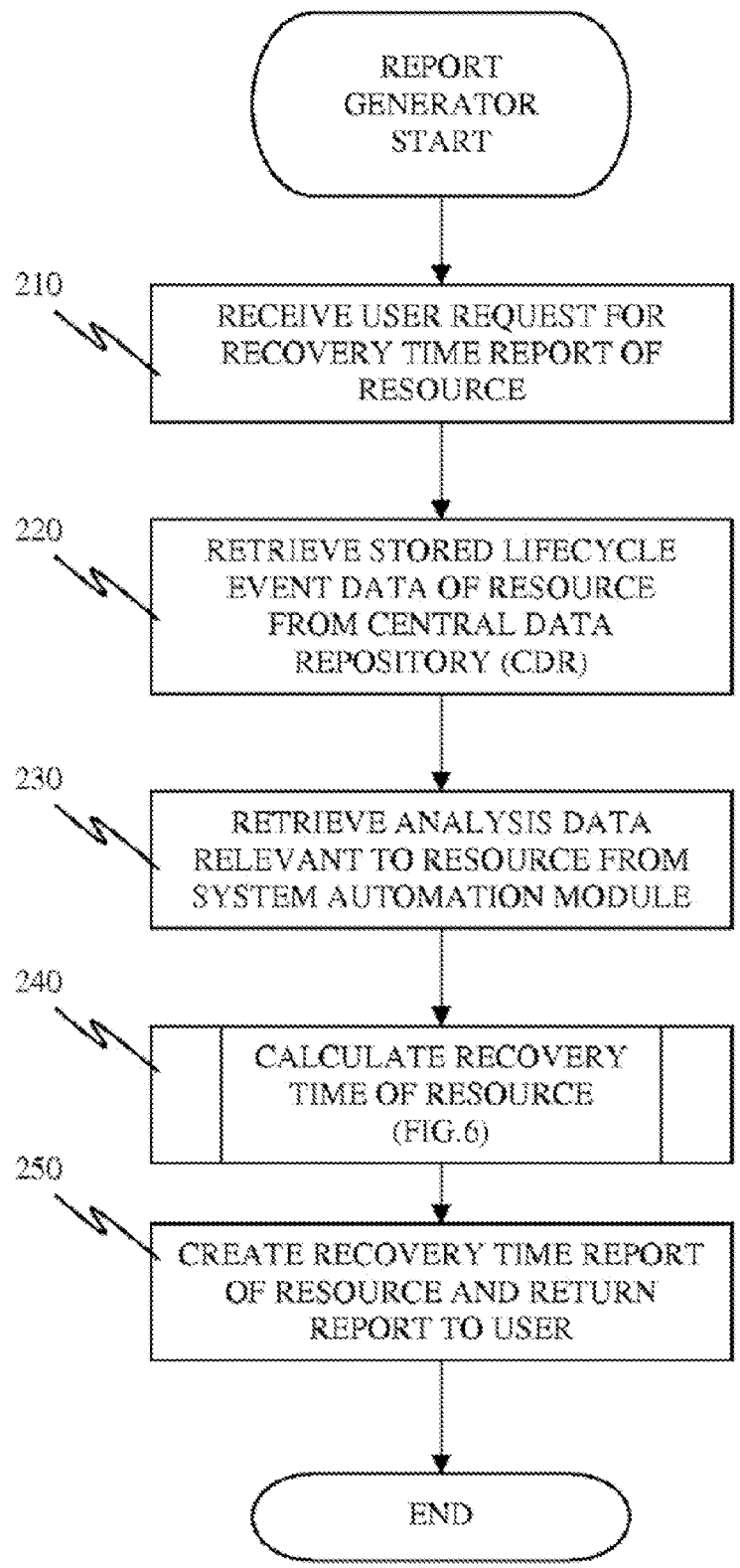
FIG. 5 is a flowchart depicting the method for reporting recovery time for a resource interdependent to other resources in the system of FIG. 1, in accordance with the embodiments of the present invention.

FIG. 5 is a flowchart depicting the method for reporting recovery time for a resource interdependent to other resources in the system of FIG. 1, supra, in accordance with the embodiments of the present invention.

In step 210, the report generator receives a report request from a user for a recovery time report on a resource. The recovery time requested in the report request may be, inter alia, a startup time, a shutdown time, a restart time, etc.

All resources interdependent to the resource are known to the report generator to retrieve lifecycle event data of all resources to make the report.

In step 220, the report generator retrieves lifecycle event data of the resource and all resources interdependent to the resource from the central data repository (CDR).

In step 230, the report generator retrieves analysis data relevant to the resource from the system automation module.

The analysis data comprises start/stop dependencies among resources, group relationships of resource groups and respective member resources, and rules to calculate recovery time of a resource having the start/stop dependencies and the group relationships.

A recovery time of a resource is calculated depending on a type and interdependency of the resource. The resource may be, inter alia, an individual non-group resource, a group resource, etc. A resource may have, inter alia, start/stop dependencies to other resources, group relationships, and combination thereof.

An individual non-group resource, referred to as a non-group resource, may be, inter alia, an individual First Level Automation (FLA) resource such as a process or an application that can be started and stopped, an abstract resource on a higher automation level that is a reference to a FLA resource, etc.

A period of time for the non-group resource Rk to start up, defined as T(RkStartup), is a duration of the STARUP phase while the non-group resource Rk transit from OFFLINE to ONLINE, as calculated as (t2−t1) of FIG. 4, supra. A period of time for the non-group resource Rk to shut down, defined as T(RkShutdown), is a duration of the SHUTDOWN phase while the non-group resource Rk transit from ONLINE to OFFLINE, as calculated as (t4−t3) of FIG. 4, supra.

A group resource is a logical aggregation of resources to synchronize respective state of all member resources of the group resource. The group resource is regarded as a single unit such that the member resources of the group resource are atomically controlled and change states uniformly. The group resource has members that are a non-group resource and/or another group resource. Wherein the group resource in OFFLINE state is requested ONLINE, the state of the group resource transits to STARTUP as at least one member becomes STARTUP, and to ONLINE when all members of the group resource are ONLINE.

A type for a group resource referred to as a move group comprises member resources that are configuration alternatives that run on different platforms. Upon a failure of an active member resource, system automation automatically moves functionalities to another member resource. Another type for a group resource referred to as a choice group comprises member resources are also configuration alternatives and only one member resource can be active at a time. Upon a failure, a member resource to take over a failed member resource must be manually selected. See descriptions of FIGS. 6, 7, and 9, infra, for how to calculate the cumulative startup/shutdown time of a group resource for each type of group resource.

Wherein a resource Rk has start/stop dependencies with other resource, a period of time for a resource Rk to start up is defined as a cumulative startup time of Rk, and a period of time for the resource Rk to shut down is defined as a cumulative shutdown time of Rk. See descriptions of FIGS. 6, 7, and 8, infra, for how to calculate the cumulative startup/shutdown time of Rk.

Wherein a resource Rk is a resource having group relationships and also having start/stop dependencies, the resource is referred to as interdependent with other resources. A period of time for the interdependent resource to start up is defined as a cumulative startup time of Rk, and a period of time for the interdependent resource to shut down is defined as a cumulative shutdown time of Rk.

Wherein the recovery time requested in the report request is a cumulative startup time of a interdependent resource Rk, TIME(G_Rk) denotes a cumulative startup time of Rk that is a root node of a interdependency graph G_Rk, TIME(Rk) denotes a startup time of a non-group resource Rk, TIME(DEP_Rk) denotes a cumulative startup time of a dependency graph of Rk, and TIME(MEM_Rk) denotes a cumulative startup time of a member graph of Rk.

Wherein the recovery time requested in the report request is a cumulative shutdown time of a interdependent resource Rk, TIME(G_Rk) denotes a cumulative shutdown time of Rk that is a root node of a interdependency graph G_Rk, TIME (Rk) denotes a shutdown time of a non-group resource Rk, TIME(DEP_Rk) denotes a cumulative shutdown time of a dependency graph of Rk, and TIME(MEM_Rk) denotes a cumulative shutdown time of a member graph of Rk.

Because the cumulative startup time and the cumulative shutdown time are symmetrical with a different direction in state changes, a term cumulative recovery time is introduced to indicate either the cumulative startup time or the cumulative shutdown time in this specification. Whether the cumulative recovery time indicates either the cumulative startup time or the cumulative shutdown time is determined by the report request. Wherein the report request is for both cumulative startup time and the cumulative shutdown time, the method described in FIG. 5 is performed respectively.

In step 240, the report generator calculates recovery time of the resource using the analysis data retrieved in step 230. See description of FIG. 6, infra, for detailed steps for calculating the recovery time.

In step 250, the report generator creates the recovery time report of the resource and returns the created recovery time report to the user originated the report request.

Figure 6:
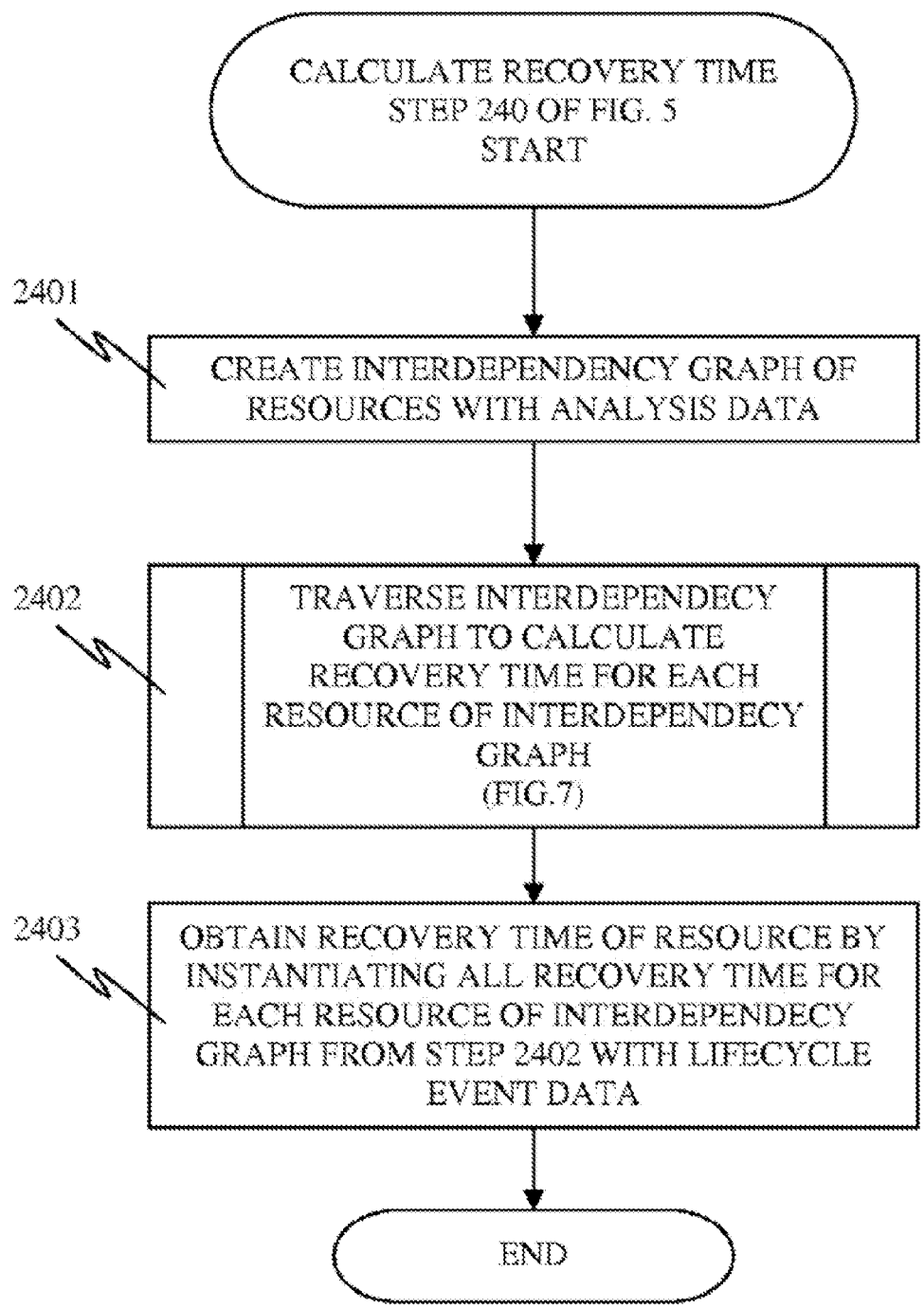
FIG. 6 is a flowchart depicting step 240 of FIG. 5, for calculating recovery time for the resource, in accordance with the embodiments of the present invention.

FIG. 6 is a flowchart depicting step 240 of FIG. 5, supra, for calculating recovery time for the resource, in accordance with the embodiments of the present invention.

In step 2401, the report generator creates an interdependency graph of resources with the analysis data retrieved in step 230. The interdependency graph represents all start/stop dependencies and/or group relationships relevant to the resource. The resource of which recovery time is requested is depicted as a root node (ROOT) of the interdependency graph and all resources having stall/stop dependencies and/or group relationships with the resource are represented as a node of the interdependency graph. A resource that is a group comprising more than one resource is depicted as a square node (RGk) in the interdependency graph. A non-group resource is depicted as a circle node (Rk) in the interdependency graph.

A dependency/relationship is depicted as a directed edge in the interdependency graph labeled according to a respective dependency/relationship the edge indicates.

Figure 6A:
FIG. 6A illustrates an example of a graph depicting a start dependency.
Figure 6B:
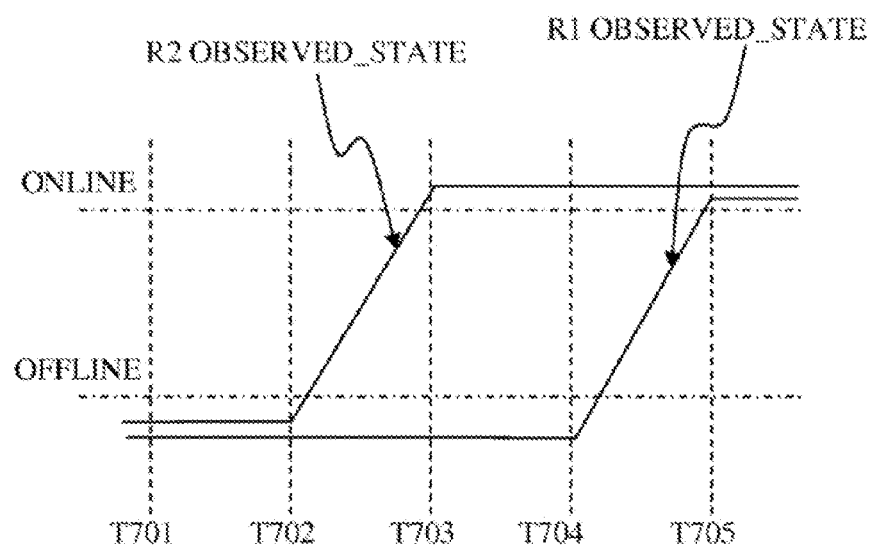
FIG. 6B illustrates relative state changes of R1 and R2 in FIG. 6A.
Figure 6C:
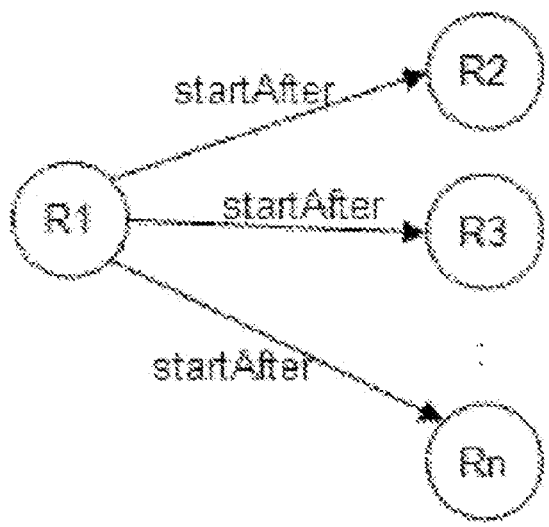
FIG. 6C illustrates an example of a graph depicting multiple start dependencies from R1 to resources (R2 . . . Rn).

A start dependency represented by a "startAfter" edge from a resource R1 to a resource R2 denotes that R1 transits from OFFLINE to STARTUP after the R2 becomes ONLINE. See FIG. 6A for an example of a graph depicting a start dependency. See FIG. 6B for relative state changes of R1 and R2 in FIG. 6A. Wherein a resource has start dependencies with more than one resource, each start dependency is represented by a respective "startAfter" edge. The resource transits from OFFLINE to STARTUP after all resources to which the resource has "startAfter" edge become ONLINE. See FIG. 6C for an example of a graph depicting multiple start dependencies from R1 to resources (R2 . . . Rn). There is no sequence dependency among the resources R2 . . . Rn, which enables the resources R2 . . . Rn to start/stop simultaneously.

A stop dependency represented by a "stopAfter" edge from a resource R1 to a resource R2 denotes that the R1 transits to SHUTDOWN after the R2 becomes OFFLINE. Representing the stop dependency and multiple stop dependencies in graphs are analogous to the aforementioned representation of the start dependency and multiple start dependencies, respectively.

The start dependency and the stop dependency are collectively referred to as a sequence dependency, or as a dependency in this specification. Accordingly, the "startAfter" edge and the "stopAfter" edge are collectively referred to as a sequence edge.

Figure 6D:
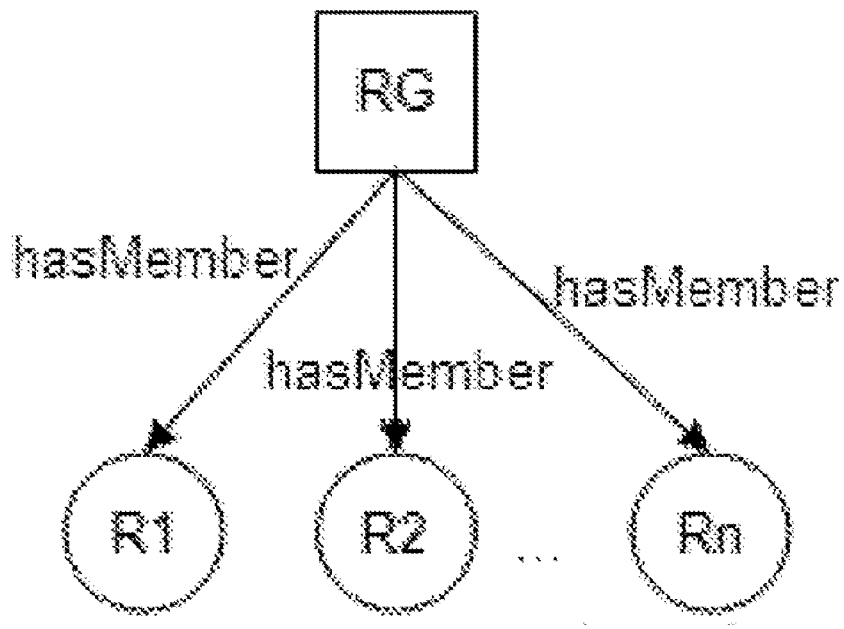
FIG. 6D is an example of a graph depicting a group relationship from RG to resources (R1, R2 . . . Rn) in the interdependency graph.

A group relationship represented by a "hasMember" edge from a group resource RG to a resource Rk denotes that RG is a group resource that has Rk as a member of the RG. See FIG. 6D for an example of a graph depicting a group relationship from RG to resources (R1, R2 . . . Rn) in the interdependency graph.

A graph with a root node connected by a sequence edge to another node is defined as a dependency graph (DEP) of the root node. A graph with a root node connected by a membership edge to another node is defined as a member graph (MEM) of the root node.

Figure 6E:
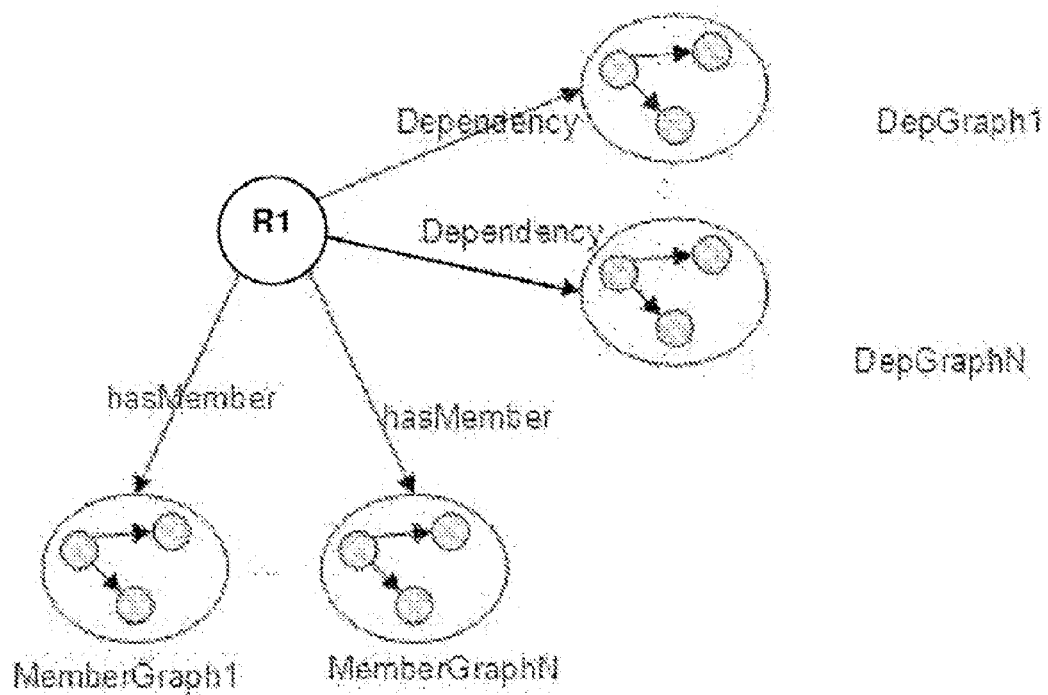
FIG. 6E is an example of a graph depicting an interdependency graph comprising multiple dependency graphs and multiple member graphs from a root node R1.

See FIG. 6E for an example of a graph depicting an interdependency graph comprising multiple dependency graphs and multiple member graphs from a root node R1.

In step 2402, the report generator traverses the interdependency graph of resources to create a recovery time formula of the resource and to calculate terms of the recovery time formula. See description of FIG. 7, infra, for detailed steps for traversing the interdependency graph.

In step 2403, the report generator obtains the recovery time of the resource by instantiating all terms of the recovery time formula calculated in step 2402 with lifecycle event data retrieved in step 220 of FIG. 5, supra.

Figure 7:
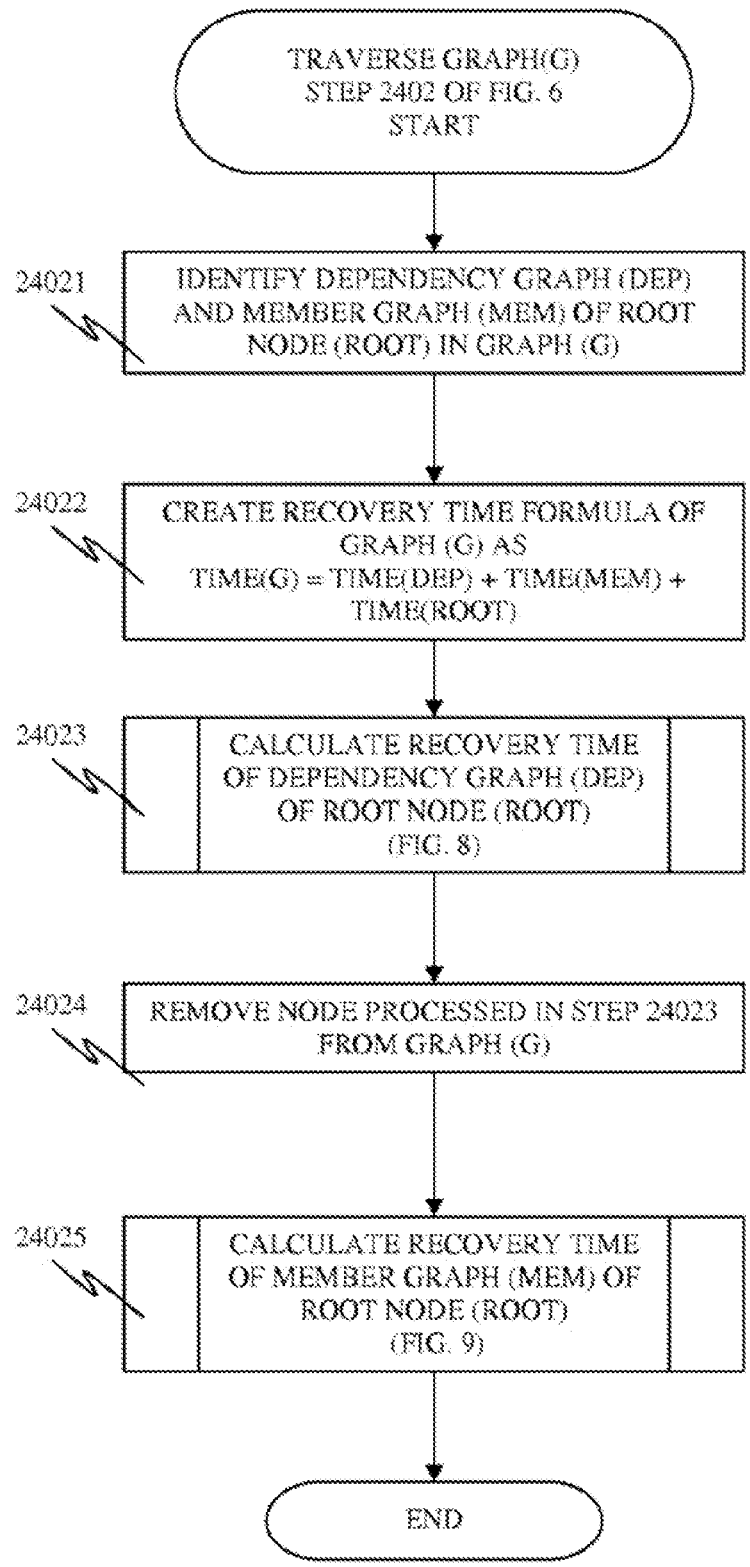
FIG. 7 is a flowchart depicting step 2402 of FIG. 6, for traversing the interdependency graph (G) created in step 2401 of FIG. 6, in accordance with the embodiments of the present invention.

FIG. 7 is a flowchart depicting step 2402 of FIG. 6, supra, for traversing the interdependency graph (G) created in step 2401 of FIG. 6, supra, in accordance with the embodiments of the present invention.

Any subgraph having interdependency within the subgraph is traversed by the steps presented in the flowchart of FIG. 7 to calculate a recovery time represented by the subgraph.

In step 24021, the report generator identifies dependency graphs (DEP) and member graphs (MEM) from the root node (ROOT) in the interdependency graph (G).

In step 24022, the report generator creates a recovery time formula for the interdependency graph (G) as a sum of a recovery time for dependency graphs (DEP), a recovery time for member graphs (MEM), and a recovery time for the root node (ROOT) of graph, denoted as:

$$TIME(G)=TIME(DEP)+TIME(MEM)+TIME(ROOT) \quad \text{[Formula 1]}$$

Wherein a graph U has only one node R, a recovery time of the graph is instantiated as a recovery time of a resource represented by the node R, i.e., TIME(G)=TIME(R), according to the [Formula 1] because there is no dependency graph or member graph. Because the recovery time for the root node. TIME(ROOT) in [Formula 1], is a recovery time for a single-node graph, TIME(ROOT) is instantiated in step 24022.

Wherein the recovery time requested is a startup time, the recovery time of the node R that represents a non-group resource is a startup time of the non-group resource, that is a duration of the STARUP phase for the non-group resource during which the non-group resource transit from OFFLINE to ONLINE, as calculated as $(t2-t1)$ of FIG. 4, supra, such that $TIME(R)=(t2-t1)$.

Wherein the recovery time requested is a shutdown time, the recovery time of the node R that represents a non-group resource is a shutdown time of the non-group resource, that is a duration of the SHUTDOWN phase for the non-group resource during which the non-group resource transit from ONLINE to OFFLINE, as calculated as $(t4-t3)$ of FIG. 4, supra, such that $TIME(R)=(t4-t3)$.

Wherein the node R represents an end-to-end resource reference and has measured values of a startup time and a shutdown time, $(t2-t1)$ and $(t4-t3)$, respectively, the recovery time of the node R is instantiated as a non-group resource.

Regardless of the recovery time requested, the recovery time of the node R that represents all group resource other than the end-to-end resource reference is zero (0) because a group resource is only a logical aggregation to represent all member resources of the group resource and there is no measured value for the group resource.

The recovery time for the root node (ROOT) is instantiated according to the type of the resource represented by the root node and the recovery time requested.

In step 24023, the report generator calculates TIME(DEP) that is the recovery time for dependency graphs (DEP) of the root note (ROOT). See description of FIG. 8, infra, for detailed steps for calculating TIME(DEP). The dependency graphs of the root node are evaluated prior to the member graphs because the recovery time of the member graph of the root node may be affected by dependencies originating from the dependency graphs of the root node, resulting in longer recovery time for the member graph of the root node.

Wherein a dependency graph DEP consists of a single dependency from a first node Ri to a second node Rj, wherein the nodes Ri and Rj are root nodes of respective interdependency graphs comprising at least one resource, the recovery time for the dependency graph DEP is a sum of a cumulative recovery time of a graph having the first node Ri as a root (G_Ri) and a cumulative recovery time of a graph having the second node Rj as a root (G_Rj), denoted as:

$$TIME(DEP)=TIME(G.sub.-Ri)+TIME(G.sub.-Rj) \quad \text{[Formula 2]}$$

In step 24024, the report generator removes, from the interdependency graph (G), nodes that had been processed while calculating TIME(DEP) in step 24023, not to count recovery time of a same node twice. The report generator removes a node R representing a resource by assigning zero (0) to recovery time of the resource TIME(R).

Figure 7A:
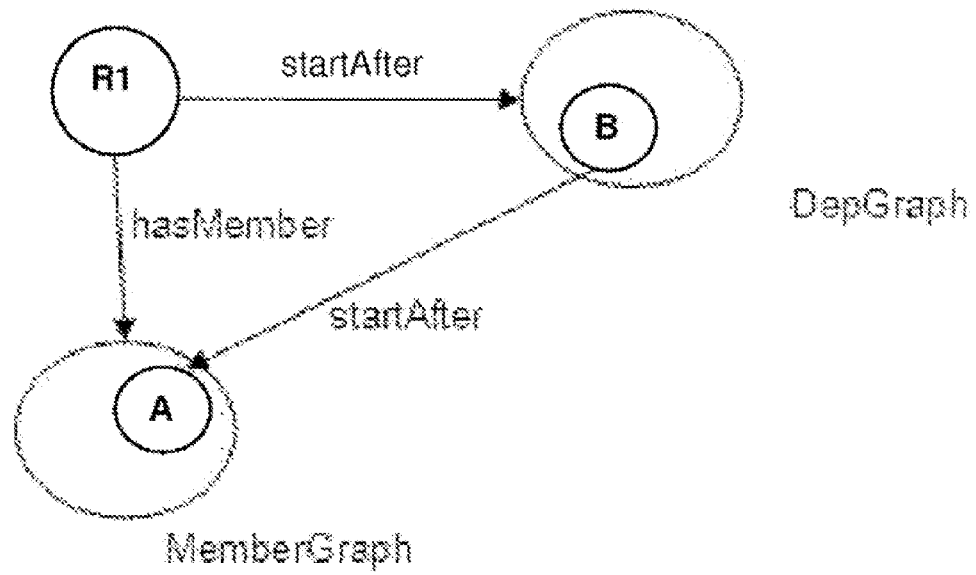
FIG. 7A illustrates an example of a dependency graph comprising a node having dependency to another node in a member graph of a root node.

See FIG. 7A for an example of a dependency graph comprising a node having dependency to another node in a member graph of a root node. In a computing environment depicted in the example, a resource A is a member of a resource R1 and a resource B has a start/After dependency to the resource A. Consequently, the resource A becomes online, then the resource B is started, and when the resource B becomes online, the resource R1 can start. Because the resource R1 starts when the resource A is already online, to calculate a startup time for the resource R1, which is the longest startup time of all member resources based on the assumption that all member resources start concurrently, the resource A needs not be counted in calculating the startup time for the resource R1.

Figure 7B:
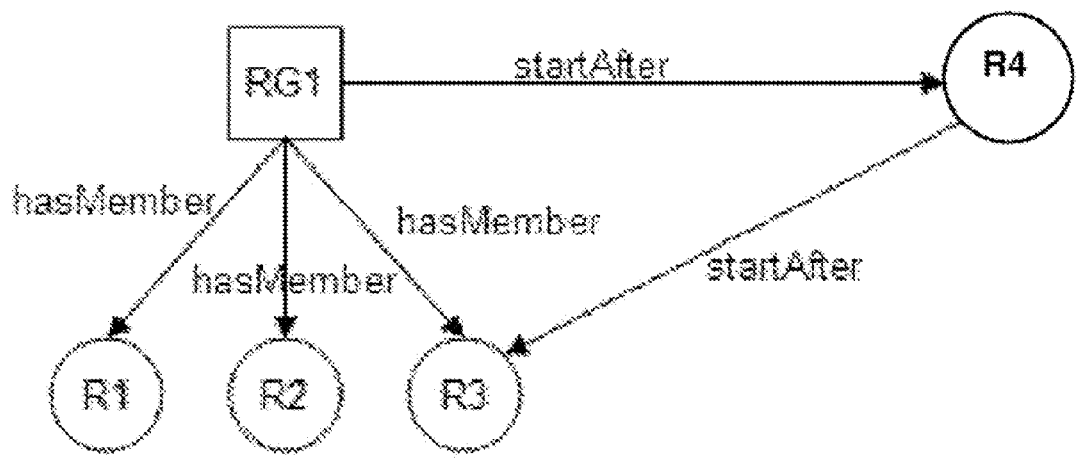
FIG. 7B illustrates an example of a graph depicting interdependencies of a resource group RG1.

See FIG. 7B for an example of a graph G1 depicting interdependencies of a resource group RG1. A recovery time of the resource group RG1 is a sum of recovery time of dependency graphs, recovery time of member graphs, and a recovery time of the resource group RG1. i.e., TIME(G1)=TIME(DEP)+TIME(MEM)+TIME(RG1). While calculating TIME(DEP) as in step 24023, a recovery time of node R4 is calculated as a sum of recovery time of node R4 and recovery time of node R3, i.e., TIME(DEP)=TIME(R4)+TIME(R3). The node R3 in a member graph of the resource group RGI needs not be counted in calculating TIME(MEM) because recovery time of the node R3 is already accounted for.

In step 24025, the report generator calculates TIME (MEM) that is the recovery time for member graphs (MEM) of the root note (ROOT) without looking into the nodes removed in step 24024.

Wherein a member graph MEM representing a collection group consists of a single group resource node RGI having member nodes M1 . . . Mm, wherein member nodes are interdependency graphs comprising at least one resource, the recovery time for the member graph MEM is the longest recovery time of member nodes, denoted as:

$$TIME(MEM)=MAX(TIME(M1)\ldots TIME(Mm)) \quad \text{[Formula 3]}.$$

Figure 9:
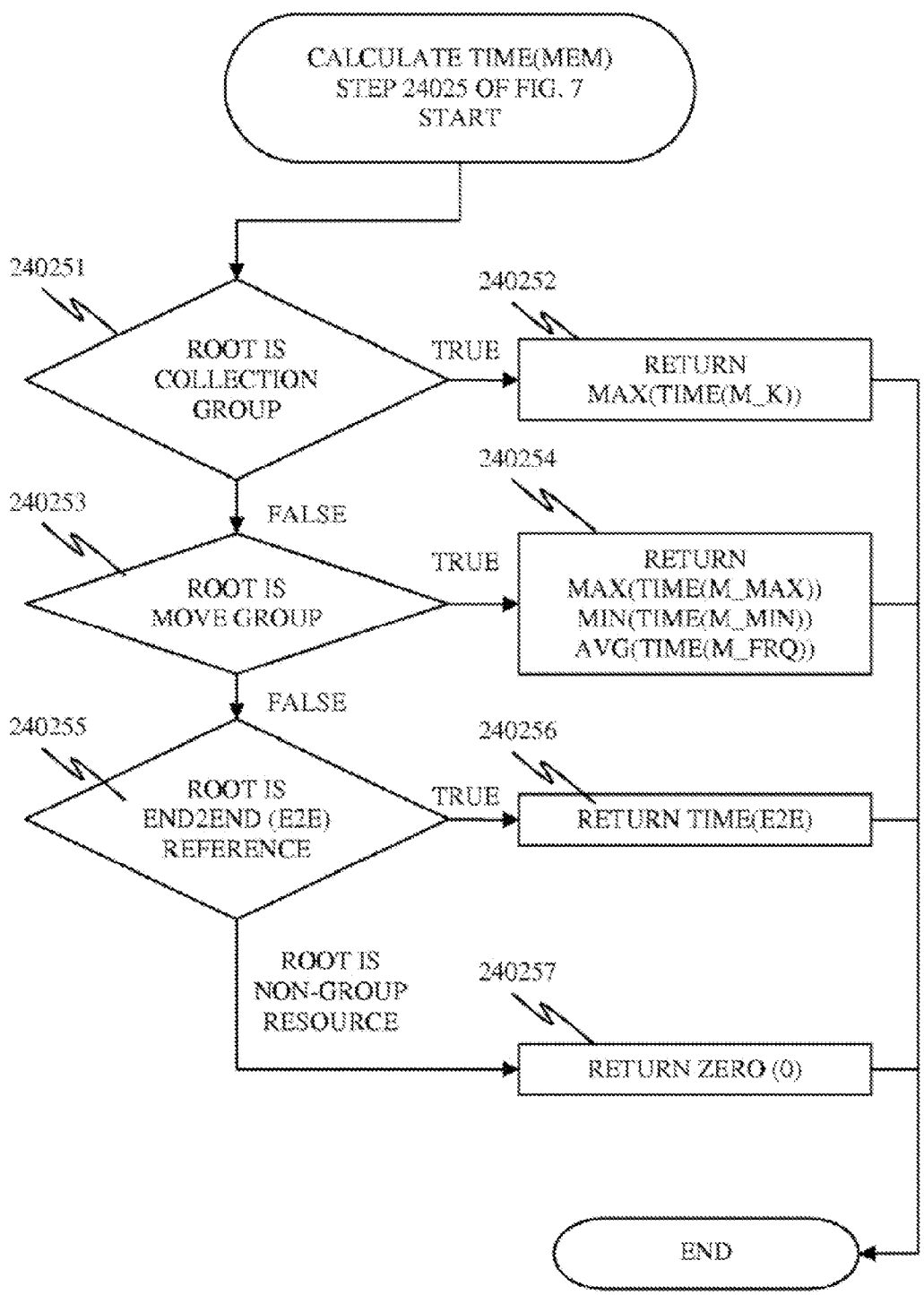
FIG. 9 is a flowchart depicting step 24025 of FIG. 7, for calculating the recovery time of a member graph of the root node, TIME(MEM), in accordance with the embodiments of the present invention.

See description of FIG. 9, infra, for detailed steps for calculating TIME(MEM) according to a group type of the resource group.

Figure 8:
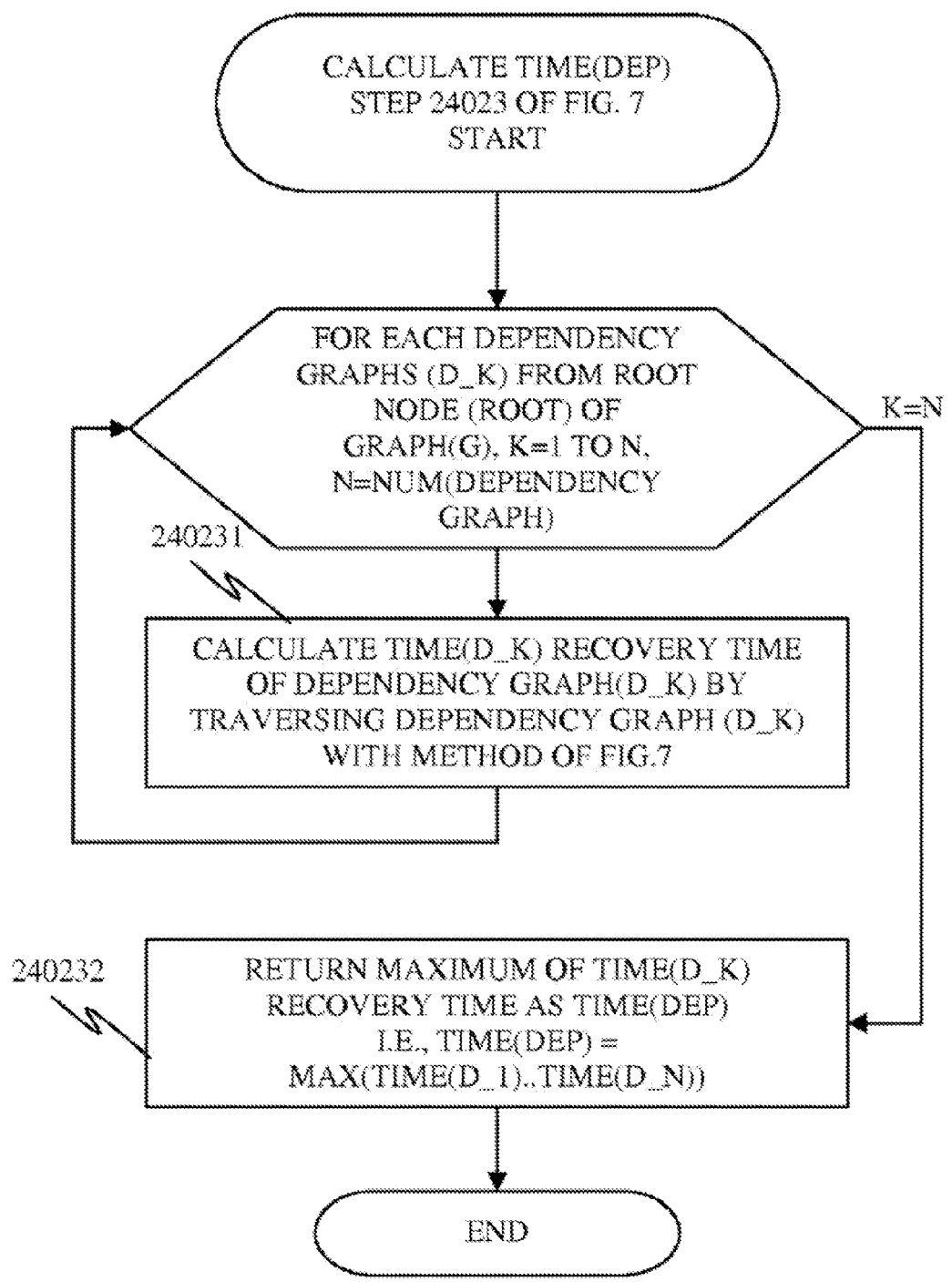
FIG. 8 is a flowchart depicting step 24023 of FIG. 7, for calculating the recovery time of the dependency graph of the root node, TIME(DEP), in accordance with the embodiments of the present invention.

FIG. 8 is a flowchart depicting step 24023 of FIG. 7, supra, for calculating the recovery time of the dependency graph of the root node, TIME(DEP), in accordance with the embodiments of the present invention.

In step 240231, the report generator calculates recovery time of each dependency graph DER, by adding TIME (ROOT) and TIME(Rk) for each node Rk that has an incoming dependency edge from the root node, i.e., TIME(DEPk)=TIME(ROOT)+TIME(Rk), wherein k is a positive integer from one (1) to the number of dependencies from the root node. Wherein the node Rk is a root node of a graph (Gk) that is also an interdependency graph, the graph Gk is traversed by the steps 24021, 24022, 24023, 24024, and 24025 of FIG. 7, supra, to calculate TIME(G1).

In step 240232, the report generator selects the largest TIME(DEPk) from step 240231 and returns as TIME(DEP), i.e., TIME(DEP)=MAX(TIME(DEPk)), wherein DEPk is a respective dependency graph of ROOT.

FIG. 9 is a flowchart depicting step 24025 of FIG. 7, supra, for calculating the recovery time of a member graph of the root node, TIME(MEM), in accordance with the embodiments of the present invention.

In step 240251, the report generator determines whether the root node ROOT is a collection group. If the report generator determines that root node ROOT is a collection group, the report generator proceeds with step 240252. If the report generator determines that root node ROOT is not a collection group, the report generator proceeds with step 240253.

In step 240252, the report generator calculates the longest recovery time of each member graph MEM and returns as TIME(MEMk), i.e., TIME(MEM)=MAX(TIME(MEMk)), wherein MEMk is a respective member graph of ROOT.

In step 240253, the report generator determines whether the root node ROOT is a move group. If the report generator determines that root node ROOT is a move group, the report generator proceeds with step 240254. If the report generator determines that root node ROOT is not a move group, the report generator proceeds with step 240255.

In step 240254, the report generator calculates the recovery time of each member Mk in the move group. Because only one member in the move group is active at one time, the recovery time of the move group depends on which member is selected to be activated. The recovery time of the move group is represented by a set of {MAX, MIN, AVG}, wherein MAX denotes the longest recovery time of a first member, MIN denotes the shortest recovery time of a second member, and AVG denotes an average recovery time of a most frequently selected member M_FRQ, which represents the most reliable data of usage.

In step 240255, the report generator determines whether the root node ROOT is an end-to-end (E2E) resource reference. If the report generator determines that root node ROOT is an end-to-end (E2E) resource reference, the report generator proceeds with step 240256. If the report generator determines that root node ROOT is not an end-to-end (E2E) resource reference, the report generator proceeds with step 240257.

In step 240256, the report generator returns recovery time of the end-to-end (E2E) resource reference as TIME(MEM) wherein the recovery time data or the end-to-end (E2E) resource reference is available. The report generator returns zero (0) wherein the recovery time data is not available. The recovery time data of the end-to-end (E2E) resource reference is available wherein a cumulative recovery time value of a First Level Automation (FLA) resource that the end-to-end (E2E) resource refers to is retrieved as a lifecycle event data. from the central data repository (CDR).

In step 240257, the report generator determines that root node ROOT is a non-group resource. The report generator returns zero (0) as TIME(MEM).

Figure 10:
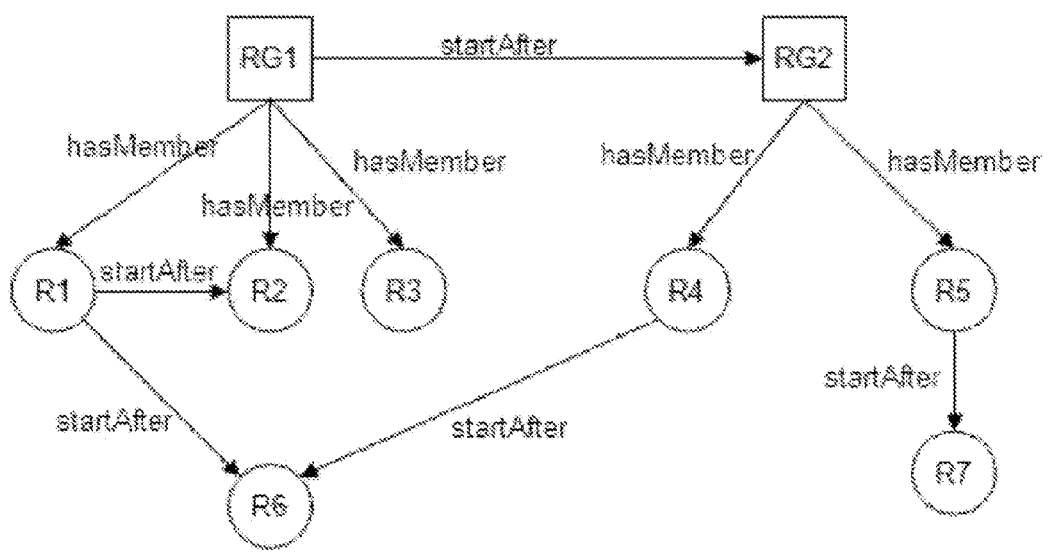
FIG. 10 illustrates an example of an interdependency graph depicting start dependencies in a heterogeneous computing environment, in accordance with the embodiments of the present invention.

FIG. 10 illustrates an example of an interdependency graph depicting start dependencies in a heterogeneous computing environment, in accordance with the embodiments of the present invention.

A user request for a recovery time report for a group resource RGI is received in step 210 of FIG. 5, supra. The recovery time requested is a startup time. The report generator retrieves relevant lifecycle event data from the central data repository (CDR) for all relevant resources in step 220 of FIG. 5, supra. The analysis data for the relevant resources are retrieved in step 230 of FIG. 5, supra.

In step 240 of FIG. 5, supra, to calculate the startup time for RG1, the report generator performs steps 2401, 2402, and 2403 of FIG. 6, supra.

In step 2401, the interdependency graph G_RG1 for RG1 is created as illustrated in FIG. 10. The group resource RG 1 is a root node of the interdependency graph G_RG 1 for RG 1. A subgraph of the interdependency graph G_RG 1 having a node Rk as a root of the subgraph is defined as a graph G_RK comprising the node RK and all nodes that are reachable from the node RK via edges going out from the node RK, regardless of a type of edge, either a start/stop dependency or a group relation. The graph G_RK is employed While traversing the interdependency graph G_RG 1 in step 2402, infra, to analyze the node Rk that has an outgoing edge.

In step 2402, to calculate a startup time for RG1, the report generator traverses the interdependency graph G_RG1 for RG1 resulting in a startup time formula of G_RG1, by performing steps 24021, 24022, 24023, 24024, and 24025 of FIG. 7, supra.

In step 24021 for RG1, the report generator identifies a dependency graph (DEP) of RGI comprising a dependency from RG1 to RG2, and a member graph (MEM) of RG1 comprising three member resources R1, R2, and R3, which are non-group resources.

In step 24022 for RG 1, the report generator creates the startup time formula of G_RG as a sum of a startup time for the dependency graph (DEP_RG1), a startup time for the member graph (MEM_RG1), and a resource startup time for the root node RG1, i.e., TIME (G_RG1)=TIME(DEP_RG1)+TIME(MEM_RG1)+TIME (RG1). Because the root node RG1 is a group resource, TIME(RG1) is zero (0) as described in step 24022 of FIG. 7, supra. Consequently, the startup time of G_RG1 is a sum of the startup time for the dependency graph (DEP_RG1) and the startup time for the member graph (MEM_RG1), i.e., TIME(G_RG1)=TIME(DEP_RG1)+TIME(MEM_RG1).

In step 24023 for RG1, the report generator calculates the startup time for the dependency graph (DEP_RG1). The startup time of the dependency graph is a sum of the startup time for RG1 and a startup time for RG2, i.e., TIME(DEP_RG1)=TIME(RG1)+TIME(RG2). Because TIME(RG1) is zero (0), the startup time of the dependency graph is calculated as the startup time for RG2, i.e., TIME(DEP_RG1)=TIME(RG2). See descriptions of FIG. 8, supra, for calculating startup time of the dependency graph wherein there is more than one dependency edge in the dependency graph.

To calculate the startup time of RG2, the report generator traverses a graph G_RG2 having RG2 as a root node with steps 24021, 24022, 24023, 24024, and 24025 of FIG. 7, supra.

In step 24021 for RG2, the report generator identifies a member graph (MEM_RG2) of RG2, comprising two member resources R4 and R5, which are non-group resources.

In step 24022 of RG2, because RG2 has no dependency, the startup time for RG2 is a sum of a startup time for the member graph MEM2 and a startup time for the root node RG2, i.e., TIME(G_RG2)=TIME(MEM_RG2)+TIME(RG2). Because RG2 is a group resource, the startup time for the root node RG2 is zero (0), i.e., TIME(RG2)=0. Consequently, the startup time for RG2 is equal to the startup time for the member graph MEM_RG2, i.e., TIME(G_RG2)=TIME (MEM_RG2). Because there is no dependency graph for RG2, the report generator proceeds with step 24025.

In step 24025 for RG2, the report generator calculates the startup time for the member graph MEM_RG2 as the longest startup time among a cumulative startup time of R4 and a cumulative startup time of R5 pursuant to Formula 3 of FIG. 7, supra. To calculate the cumulative startup times of R4 and R5, the report generator traverses a graph G_R4 having R4 as a root node and a graph G_R5 having R5 as a root node, respectively, with steps 24021, 24022, 24023, 24024, and 24025 of FIG. 7, supra. The order of traversing the graphs G_R4 and G_R5 presented in this specification is irrelevant to the nature of the present invention.

In step 24021 for R4, the report generator identifies a dependency graph (DEP_R4) of R4, comprising a node R6.

In step 24022 for R4, because R4 has no member graph, the report generator creates a startup time formula for R4 as a sum of the startup time of the dependency graph DEP_R4 and a startup time of R4, i.e., TIME(G_R4)=TIME(DEP_R4)+TIME(R4).

In step 24023 for R4, because the dependency graph DEP_R4 consists of a single dependency to a node R6 representing a non-group resource, the startup time of the dependency graph DEP_R4 is equal to a startup time of R6, i.e., TIME(DEP_R4)=TIME(R6). The node R6 does not have a dependency to another resource, and the startup time of the non-group resource R6 is a measured value (t2−t1). Consequently, the startup time of the graph G_R4 is calculated as a sum of the startup time of R6 and the startup time of R4, i.e., TIME(G_R4)=TIM E(R6)+TIME(R4).

In step 24024 for R4, the report generator removes the nodes R4 and R6 from the interdependency graph G_RG1 because the startup times of R4 and R6 are accounted for. Because the graph G_R4 does not have a member graph, the report generator completes traversing the graph G_R4 for R4 and returns the startup time for the graph G_R4, i.e., TIME(G_R4)=TIME(R6)+TIME(R4).

In step 24021 for R5, the report generator identifies a dependency graph (DEP_R5) of R5, comprising a node R7.

In step 24022 for R5, because R5 has no member graph, the report generator creates a startup time formula for R5 as a sum of the startup time of the dependency graph DEP_R5 and a startup time of R5, i.e., TIME(G_R5)=TIME(DEP_R5)+TIME(R5).

In step 24023 for R5, because the dependency graph DEP_R5 consists of a single dependency to a node R7 representing a non-group resource, the startup time of the dependency graph DEP_R5 is equal to a startup time of R7, i.e., TIME(DEP_R5)=TIME(R7). The node R7 does not have a dependency to another resource, and the startup time of the non-group resource R7 is a measured value (t2−t1). Consequently, the startup time of the graph G_R5 is calculated as a sum of the startup time of R7 and the startup time of R5, i.e., TIME(G_R5)=TIME(R7)+TIME(R5).

In step 24024 for R5, the report generator removes the nodes R5 and R7 from the interdependency graph G_RG1 because the startup times of R5 and R7 are accounted for. Because the graph G_R5 does not have a member graph, the report generator completes traversing the graph G_R5 for R5 and returns the startup time for the graph G_R5, i.e., TIME(G_R5)=TIME(R7)+TIME(R5).

Back in step 24025 for RG2, the report generator receives the cumulative startup times of R4 and R5, respectively. Pursuant to Formula 3 of FIG. 7, supra, the startup time of the group resource RG2 is a largest value of all cumulative startup times of members, the nodes R4 and R5, i.e., TIME(MEM_RG2)=MAX(TIME(G_R4), TIME(G_R5)). Now that the report generator has values of the cumulative startup time of R4, TIME(G_R4)=TIME(R6)+TIME(R4), and the cumulative startup time of R5, TIME(G_R5)=TIME(R7)+TIME(R5), the report generator returns the largest cumulative startup time among R4 and R5, i.e., MAX((TIME(R6)+TIME(R4)), (TIME(R7)+TIME(R5))) and completes traversing the graph G_RG2.

Back in step 24023 for RG1, the report generator receives the startup time for RG2 which is the largest cumulative startup time among R4 and R5, i.e., TIME(RG2)=MAX((TIME(R6)+TIME(R4)), (TIME(R7)+TIME(R5))). Consequently, the startup time for the dependency graph is the largest cumulative startup time among R4 and R5, i.e., TIME(DEP_RG1)=MAX((TIME(R6)+TIME(R4)), (TIME(R7)+TIME(R5))).

In step 24024 for RG1, the report generator removes the node RG2 from the interdependency graph G_RG1 because the startup time of RG2 is accounted fo In step 24025 for RG1, the report generator calculates the startup time for the member graph MEM_RG1 as the longest startup time among a cumulative startup times of R1, R2, and R3, represented by a graph G_R1 having R1 as a root node, a graph G_R2 having R2 as a root node, and a graph G_R3 having R3 as a root node, respectively, i.e., TIME(MEM_RG1)=MAX(TIME(G_R1), TIME(G_2), TIME(G_R3)), pursuant to Formula 3 of FIG. 7, supra.

To calculate the cumulative startup times of R1, R2, and R3, the report generator traverses the graph G_R1, the graph G_R2, and the graph G_R3, respectively, with steps 24021, 24022, 24023, 24024, and 24025 of FIG. 7, supra. The order of traversing the graphs G_R1, G_R2, and G_R3 presented in this specification is irrelevant to the nature of the present invention.

In step 24021 for R1, the report generator identifies a dependency graph of R1 (DEP_R1), comprising a node R2, because the node R6 is already processed and removed from the interdependency graph G_RG1.

In step 24022 for R1, because R1 has no member graph, the report generator creates a startup time formula for R1 as a sum of the startup time of the dependency graph DEP_R1 and a startup time of R1, i.e., TIME(G_R1)=TIME(DEP_R1)+TIME(R1).

In step 24023 for R1, because the dependency graph DEP_R1 consists of a single dependency to a node R2 representing a non-group resource, the startup time of the dependency graph DEP_R1 is equal to a startup time of R2, i.e., TIME(DEP_R1)=TIME(R2). The node R2 does not have a dependency to another resource, and the startup time of the non-group resource R2 is a measured value (t2−t1) for R2. Consequently, the startup time of the graph G_R1 is calculated as a sum of the startup time of R2 and the startup time of R1, i.e., TIME(G_R1)=TIME(R2)+TIME(R1).

In step 24024 for R1, the report generator removes the nodes R1 and R2 from the interdependency graph G_RG1 because the startup times of R1 and R2 are accounted for. Because the graph G_R1 does not have a member graph, the report generator completes traversing the graph G_R1 for R1 and returns the startup time for the graph G_R1, i.e., TIME(G_R1)=TIME(R2)+TIME(R1).

Because the node R2 is removed in step 24024 for R1, the report generator proceeds with the graph G_R3.

In step 24021 for R3, the report generator discovers that the graph G_R3 is a single node graph consisting of a non-group resource R3.

In step 24022 for R3, the report generator creates a startup time formula for R3 as a startup time of R3, that is a measured value (t2−t1) for R3, i.e., TIME(G_R3)=TIME(R3). Because there is no dependency graph, the report generator proceeds with step 24024.

In step 24024 for R3, the report generator removes the node R3 from the interdependency graph G_RG1. Because there is no member graph, the report generator completes traversing the graph G_R3 and returns the startup time of R3, i.e., TIME(R3).

Back in step 24025 for RG1, the report generator receives the cumulative startup time of R1, TIME(G_R1)=TIME(R2)+TIME(R1), the cumulative startup time of R2, zero (0), and the cumulative startup time of R3, TIME(R3). Because the startup time of the member graph of RG1 is the longest startup time among a cumulative startup times of R1, R2, and R3, i.e., TIME(MEM_RG1)=MAX((TIME(R2)+TIME(R1)), 0, TIME(R3)). After step 24025 for RG1. the report generator proceeds with step 2403 of FIG. 6, supra.

In step 2403, because all terms in the startup time formula for RG1 is resolved to startup times of non-group resources, the report generator instantiates all recovery time with a startup time data of respective resource retrieved in step 220 of FIG. 5, supra. The startup time of the group resource RG1 represented by the interdependency graph G_RG1 is calculated as the sum of the startup time for the dependency graph (DEP_RG1) and the startup time for the member graph (MEM_RG1), i.e., TIME (G_RG1)=TIME (DEP_RG1)+TIME (MEM_RG1) after step 24022 for RG 1, =MAX ((TIME (R 6)+TIME (R 4)), (TIME (R 7)+TIME (R 5)))+TIME (MIM_RG1) after step 24023 for RG 1,=MAX ((TIME (R 6)+TIME (R 4)), (TIME (R 7)+TIME (R 5)))+MAX ((TIME (R 2)+TIME (R 1), 0, TIME (R 3)), after step 24025. ##EQU00001##

In step 250 of FIG. 5, supra, the report generator creates the recovery time report with the calculated startup time for RG1 and returns the report to the user in step 250 of FIG. 5, supra.

Figure 11B:
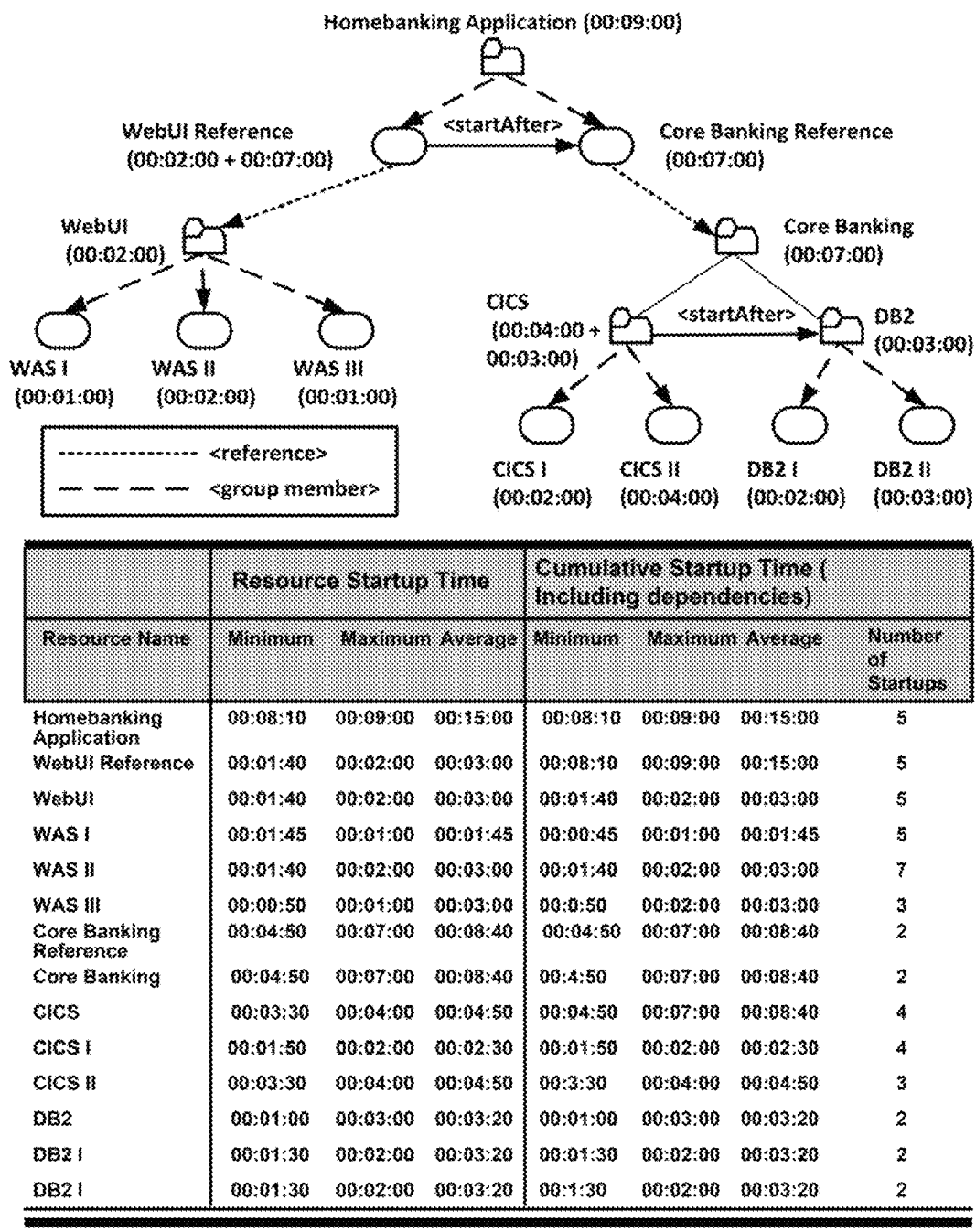
Figure 11C:
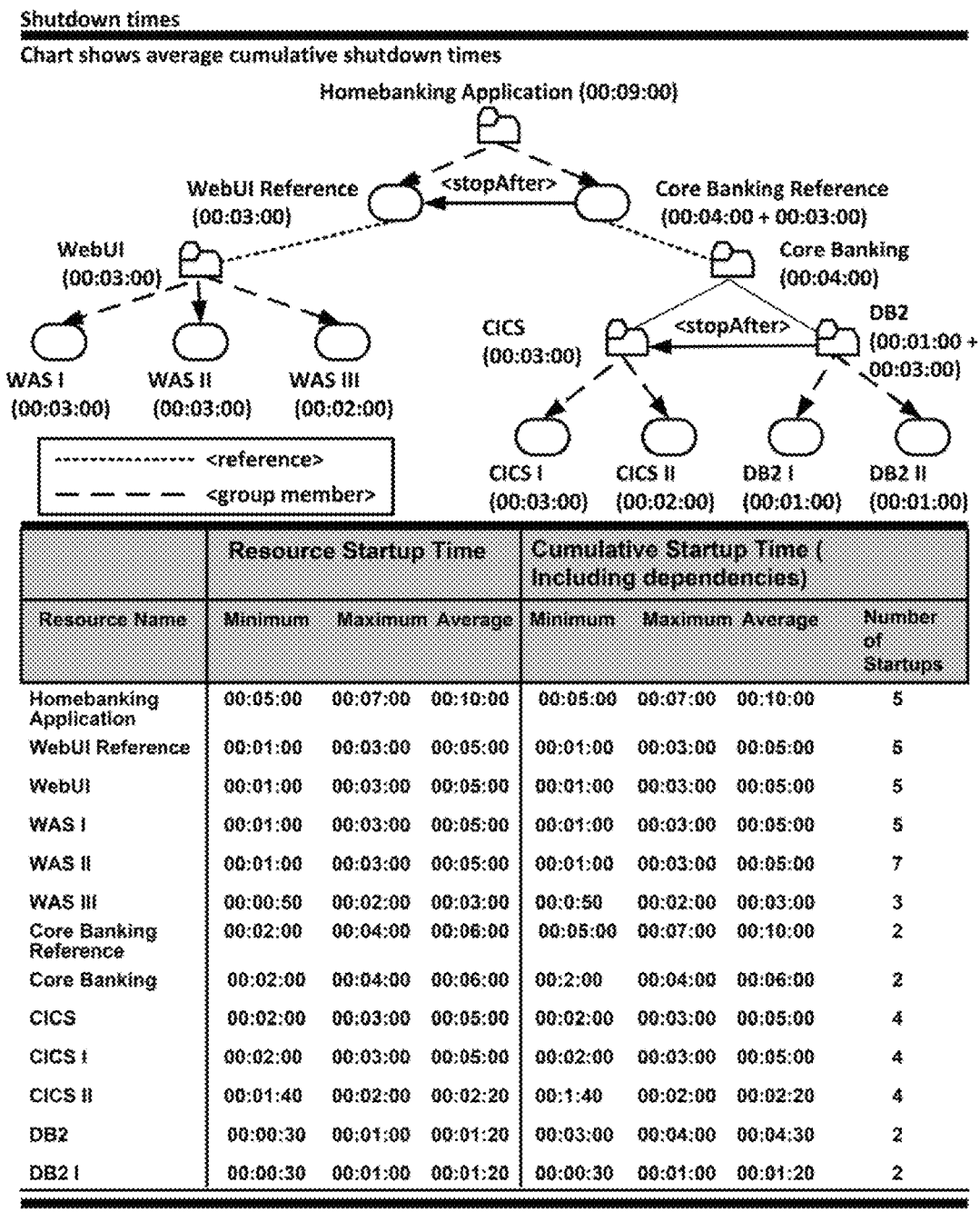

FIGS. 11A, 11B, and 11C are an example of a recovery time report generated by the report generator on the example system of FIGS. 2A, 2B, and 3, supra, in accordance with the embodiments of the present invention.

Figure 12:
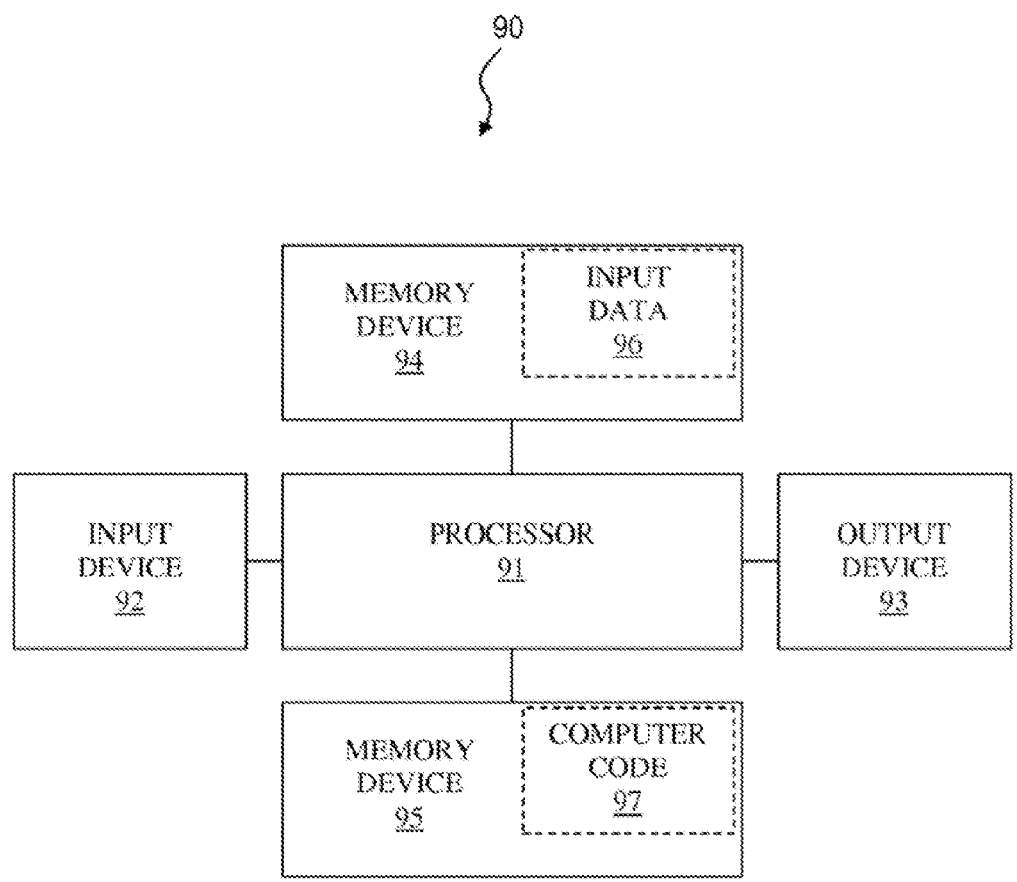
FIG. 12 illustrates a computer system used for determining recovery time for interdependent resources in a heterogeneous computing environment, in accordance with the embodiments of the present invention.

FIG. 12 illustrates a computer system 90 used for determining recovery time for interdependent resources in a heterogeneous computing environment, in accordance with the embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad. a touchscreen, a voice recognition device, a sensor, a network interface card (MC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NEC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for determining recovery time for interdependent resources in a heterogeneous computing environment according to the present invention. The processor executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 12) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 12 shows the computer system 90 as a particular configuration of hardware and software, any configuration of hardware and software, as would he known to a person of ordinary skill in the art, may be utilized for the purposes stated supra in conjunction with the particular computer system 90 of FIG. 12. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

We claim:

1. A method, comprising:
creating a graph of a root node such that the graph represents an interdependency of a resource represented by the root node, said interdependency comprising zero or more sequence dependencies of the resource and zero or more group relations of the resource, each sequence dependency of said zero or more sequence dependencies of the resource on a respective support resource represented by a respective sequence edge from the root node to a respective support node, each sequence dependency denoting that the resource transits from a first state to a second state after all support resources transit from the first state to the second state, each group relation of zero or more group relations of the resource between the resource and a respective member resource represented by a respective member edge from the root node to a respective member node, each group relation denoting that the resource transits from the first state to the second state after all member resources transit from the first state to the second state; and
traversing the graph to generate a recovery time for the resource represented by the root node, wherein the recovery time for the resource is defined as a duration of time from an initial point of time when all resources in the graph are in the first state to a final point of time when the resource represented by the root node transits to the second state as it result of transitions of all resources in the graph from the first state to the second state.

2. The method of claim 1, wherein the first state is OFFLINE and the second state is ONLINE, wherein ONLINE denotes that the resource is available for use, wherein OFFLINE denotes that the resource is not available for use and is not in transition.

3. The method of claim 1, wherein the first state is ONLINE and the second state is OFFLINE, wherein ONLINE denotes that the resource is available for use, wherein OFFLINE denotes that the resource is not available for use and is not in transition.

4. The method of claim 1, said traversing the graph comprising:
identifying zero or more dependency graphs of the root node in the graph, wherein each dependency graph of said zero or more dependency graphs comprises the respective support node as a respective root node of each dependency graph, zero or more dependency graphs of the respective support node, and zero or more member graphs of the respective support node;
respectively performing said traversing with each identified dependency graph in place of the graph, which results in a respective recovery time for the respective support resource represented by the respective support node;

calculating a dependency recovery time of the resource by selecting the largest value among all respective recovery time for the respective support resource;

removing all traversed node from the graph, wherein a traversed node of said all traversed node represents a traversed resource that had contributed a recovery time of the traversed resource in said calculating the dependency recovery time;

identifying zero or more member graphs of the root node in the graph that results from said removing, wherein each member graph of said zero or more member graphs comprises the respective member node as a respective root node of each member graph, zero or more dependency graphs of the respective member node, and zero or more member graphs of the respective member node;

respectively performing said traversing with each identified member graph in place of the graph, which results in a respective recovery time for the respective member resource represented by the respective member node;

calculating a group recovery time of the resource;

determining a unit recovery time of the resource represented by the root node; and obtaining the recovery time for the resource by adding the dependency recovery time of the resource, the group recovery time of the resource, and the unit recovery time of the resource.

5. The method of claim 4, said determining the unit recovery time of the resource comprising:

determining that the resource represented by the root node of the graph is a unit resource of which state can be observed; and determining the unit recovery time of the resource as a duration of time for the resource to transit from the first state to the second state.

6. The method of claim 4, said determining the unit recovery time if the resource comprising;

determining that the resource represented by the root node of the graph is a group resource that consists of at least one group relation of said zero or more group relations, each member resource having a respective group relation of said at least one group relation is represented by the respective member node; and determining that the unit recovery time of the resource represented by the root node of the graph is zero (0).

7. The method of claim 4, said calculating the group recovery time of the resource comprising:

determining that the resource represented by the root node of the graph is a group resource that consists of at least one group relation of said zero or more group relations, each member resource having a respective group relation of said at least one group relation is represented by the respective member node; and calculating the group recovery time of the resource by selecting the largest value among all respective recovery time for the respective member resource.

8. The method of claim 4, said calculating the group recovery time of the resource comprising:

determining that the resource represented by the root node R of the graph is a move group resource that consists of at least one group relation of said zero or more group relations, each member resource having a respective group relation of said at least one group relation is represented by the respective member node, wherein only one member said each member resource of the move group resource is required to transit from the first state to the second state;

selecting a first member resource of the move group, wherein the first member resource has the largest value for a unit recovery time of the first member resource among all member resources of the move group resource;

selecting a second member resource of the move group, wherein the second member resource has the smallest value for a unit recovery time of the second member resource among, all member resources of the move group resource;

selecting a third member resource of the move group, wherein the third member resource is the most frequently selected to transit from the first state to the second state among all member resources of the move group resource; and calculating that the group recovery time of the resource as a set comprising a first recovery time, a second recovery time, and a third recovery time from said respectively performing, wherein the first recovery time corresponds to the respective recovery time of the selected first member resource, wherein the second recovery time corresponds to the respective recovery time of the selected second member resource, and wherein the third recovery time corresponds to he respective recovery time of the selected third member resource.

9. The method of claim 4, said calculating the group recovery time of the resource comprising:

determining that the resource represented by the root node of the graph is an end-to-end resource reference that has a measured value for the group recovery time of the resource; and calculating, that the group recovery time of the resource as the measured value.

10. A computer program product, comprising a non-transitory computer usable storage medium having a computer readable program code embodied therein, said computer readable program code containing instructions that when executed by a processor of a computer system implement a method, the method comprising:

creating a graph of a root node such that the graph represents an interdependency of the resource represented by the root node among said at least one resource, said interdependency comprising zero or more sequence dependencies of the resource and zero or more group relations of the resource, each sequence dependency of said zero or more sequence dependencies of the resource on a respective support resource represented by a respective sequence edge from the root node to a respective support node, each sequence dependency denoting that the resource transits from a first state to a second state after all support resources transit from the first state to the second state, each group relation of zero or more group relations of the resource between the resource and a respective member resource represented by a respective member edge from the root node R to a respective member node, each group relation denoting that the resource transits from the first state to the second state after all member resources transit from the first state to the second state; and traversing the graph to generate a recovery time for the resource represented by the root node, wherein the recovery time for the resource is defined as a duration of time from an initial point of time when all resources in the graph are in the first state to a final point of time when the resource represented by the root node transits to the second state as a result of transitions of all resources in the graph from the first state to the second state.

11. The computer program product of claim 10, wherein the first state is OFFLINE and the second state is ONLINE, wherein ONLINE denotes that the resource is available for use, wherein OFFLINE denotes that the resource is not available tier use and is not in transition.

12. The computer program product of claim 10, wherein the first state is ONLINE and the second state is OFFLINE, wherein ONLINE denotes that the resource is available for use, wherein OFFLINE denotes that the resource is not available for use and is not in transition.

13. The computer program product of claim 10, said traversing the graph comprising:
   identifying zero or more dependency graphs of the root node in the graph, wherein each dependency graph of said zero or more dependency graphs comprises the respective support node as a respective root node of each dependency graph, zero or more dependency graphs of the respective support node, and zero or more member graphs of the respective support node;
   respectively performing said traversing with each identified dependency graph in place of the graph, which results in a respective recovery time for the respective support resource represented by the respective support node;
   calculating a dependency recovery time of the resource by selecting the largest value among all respective recovery time for the respective support resource;
   removing all traversed node from the graph, wherein a traversed node of said all traversed node represents a traversed resource that had contributed a recovery time of the traversed resource in said calculating the dependency recovery time;
   identifying zero or more member graphs of the root node in the graph that results from said removing, wherein each member graph of said zero or more member graphs comprises the respective member node as a respective root node of each member graph, zero or more dependency graphs of the respective member node, and zero or more member graphs of the respective member node;
   respectively performing said traversing with each identified member graph in place of the graph, which results in a respective recovery time for the respective member resource represented by the respective member node;
   calculating a group recovery time of the resource:
   determining a unit recovery time of the resource represented by the root node; and
   obtaining the recovery time for the resource by adding the dependency recovery time of the resource, the group recovery time of the resource, and the unit recovery time of the resource.

14. The computer program product of claim 13, said determining the unit recovery time of the resource comprising:
   determining that the resource represented by the root node of the graph is a unit resource of which state can be observed; and
   determining the unit recovery time of the resource as a duration of time for the resource to transit from the first state to the second state.

15. The computer program product of claim 13, said calculating the group recovery time of the resource comprising:
   determining that the resource represented by the root node of the graph is a group resource that consists of at least one group relation of said zero or more group relations, each member resource having a respective group relation of said at least one group relation is represented by the respective member node; and
   calculating the group recovery time of the resource by selecting the largest value among all respective recovery time tor the respective member resource.

16. The computer program product of claim 13, said calculating the group recovery time of the resource comprising:
   determining that the resource represented by the root node of the graph is a move group resource that consists of at least one group relation of said zero or more group relations, each member resource having a respective group relation of said at least one group relation is represented by the respective member node, wherein only one member said each member resource of the move group resource is required to transit from the first state to the second state;
   selecting a first member resource of the move group, wherein the first member resource has the largest value for as unit recovery time of the first member resource among all member resources of the move group resource;
   selecting a second member resource of the move group, wherein the second member resource has the smallest value for a unit recovery time of the second member resource among all member resources of the move group resource;
   selecting a third member resource of the more group, Wherein the third member resource is the most frequently selected to transit from the first state to the second state among all member resources of the move group resource; and
   calculating that the group recovery time of the resource as a set comprising a first recovery time, a second recovery time, and a third recovery time from said respectively performing, Wherein the first recovery time corresponds to the respective recovery time of the selected first member resource, wherein the second recovery time corresponds to the respective recovery time of the selected second member resource, and wherein the third recovery time corresponds to the respective recovery time of the selected third member resource.

17. The computer program product of claim 13, said calculating the group recovery time of the resource comprising:
   determining that the resource represented by the root node of the graph is an end-to-end resource reference that has a measured value for the group recovery time of the resource; and
   calculating that the group recovery time of the resource as the measured value.

18. A system, comprising:
   a processor; and
   a computer readable memory unit coupled to the processor, said memory unit containing instructions that when executed by the processor implement a method, the method comprising
      creating a graph of a root node such that the graph represents an interdependency of the resource represented by the root node among said at least one resource, said interdependency comprising zero or more sequence dependencies of the resource and zero or more group relations of the resource, each sequence dependency of said zero or more sequence dependencies of the resource on a respective support resource represented by a respective sequence edge from the root node to a respective support node, each sequence dependency denoting that the resource transits from a first state to a second state after all support resources transit from the first state to the second state, each group relation of zero or more group relations of the resource between the resource and a respective member resource represented by a respective member edge from the root node to a respective member node, each group relation denoting that the resource transits from the first state to the second state after all member resources transit from the first state to the second state; and traversing the graph to generate a recover time for the resource represented by the root node, wherein the recovery time for the resource is defined as a duration of time from an initial point of time when all resources in the graph are in the first state to a final point of time when the resource represented by the root node transits to the second state as a result of transitions of all resources in the graph from the first state to the second state.

19. The system of claim 18, wherein the first state is OFFLINE and the second state is ONLINE, wherein ONLINE denotes that the resource is available for use, wherein OFFLINE denotes that the resource is not available for use and is not in transition.

20. The system of claim 18, wherein the first state is ONLINE and the second state is OFFLINE, wherein ONLINE denotes that the resource is available for use, wherein OFFLINE denotes that the resource is not available for use and is not in transition.

21. The system of claim 18, said traversing the graph comprising:

identifying zero or more dependency graphs of the root node in the graph, wherein each dependency graph of said zero or more dependency graphs comprises the respective support node as a respective root node of each dependency graph, zero or more dependency graphs of the respective support node, and zero or more member graphs of the respective support node;

respectively performing said traversing with each identified dependency graph in place of the graph, which results in a respective recovery time for the respective support resource represented by the respective support node;

calculating a dependency recovery time of the resource by selecting the largest value among all respective recovery time for the respective support resource;

removing all traversed node from the graph, wherein a traversed node of said all traversed node represents a traversed resource that had contributed a recovery time of the traversed resource in said calculating the dependency recovery time;

identifying zero or more member graphs of the root node R in the graph that results from said removing, wherein each member graph of said zero or more member graphs comprises the respective member node as a respective root node of each member graph, zero or more dependency graphs of the respective member node, and zero or more member graphs of the respective member node;

respectively performing said traversing with each identified member graph in place of the graph, which results in a respective recovery time for the respective member resource represented by the respective member node;

calculating a group recovery time of the resource;

determining a unit recovery time of the resource represented by the root node; and obtaining the recovery time for the resource by adding the dependency recovery time of the resource, the group recovery time of the resource, and the unit recovery time of the resource.

22. The system of claim 21, said determining the unit recovery time of the resource comprising:

determining that the resource represented by the root node of the graph is a unit resource of which state can be observed; and determining, the unit recovery time of the resource as a duration of time for the resource to transit from the first state to the second state.

23. The system of claim 21, said calculating the group recovery time of the resource comprising:

determining that the resource represented by the root node of the graph is a group resource that consists of at least one group relation of said zero or more group relations, each member resource having a respective group relation of said at least one group relation is represented by the respective member node; and calculating the group recovery time of the resource by selecting the largest value among all respective recovery time for the respective member resource.

24. The system of claim 21, said calculating the group recovery time of the resource comprising:

determining that the resource represented by the root node R of the graph is a move group resource that consists of at least one group relation of said zero or more group relations, each member resource having a respective group relation of said at least one group relation is represented by the respective member node, wherein only one member said each member resource of the move group resource is required to transit from the first state to the second state;

selecting a first member resource of the move group, wherein the first member resource has the largest value for a unit recovery time of the first member resource among all member resources of the move group resource;

selecting a second member resource of the move group, wherein the second member resource has the smallest value for a unit recovery time of the second member resource among all member resources of the move group resource;

selecting a third member resource of the move group, wherein the third member resource is the most frequently selected to transit from the first state to the second state among all member resources of the move group resource; and calculating that the group recovery time of the resource as a set comprising a first recovery time, a second recovery time, and a third recovery time from said respectively performing, wherein the first recovery time corresponds to the respective recovery time of the selected first member resource, wherein the second recovery time corresponds to the respective recovery time of the selected second member resource, and wherein the third recovery time corresponds to the respective recovery time of the selected, third member resource.

25. The system of claim 21, said calculating the group recovery time of the resource comprising;

determining that the resource represented by the root node of the graph is an end-to-end resource reference that has a measured value for the group recovery time of the resource; and calculating that the group recovery time of the resource as the measured value.

\* \* \* \* \*